(12) United States Patent
Yang et al.

(10) Patent No.: US 12,701,499 B2
(45) Date of Patent: Aug. 4, 2026

(54) NETWORK SEARCH METHOD AND ELECTRONIC DEVICE

(71) Applicant: HUAWEI TECHNOLOGIES CO., LTD., Shenzhen (CN)

(72) Inventors: Rui Yang, Beijing (CN); Xuyang Du, Shenzhen (CN); Hao Song, Shenzhen (CN); Fenghui Dou, Beijing (CN); Hui Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 17/927,574

(22) PCT Filed: Mar. 29, 2021

(86) PCT No.: PCT/CN2021/083541
§ 371 (c)(1),
(2) Date: Nov. 23, 2022

(87) PCT Pub. No.: WO2021/238381
PCT Pub. Date: Dec. 2, 2021

(65) Prior Publication Data
US 2023/0180111 A1     Jun. 8, 2023

(30) Foreign Application Priority Data

May 27, 2020     (CN) ......................... 202010459949.3
Jun. 30, 2020     (CN) ......................... 202010623919.1

(51) Int. Cl.
*H04W 48/16*     (2009.01)
*H04W 48/18*     (2009.01)

(52) U.S. Cl.
CPC .......... *H04W 48/16* (2013.01); *H04W 48/18* (2013.01)

(58) Field of Classification Search
CPC .............................. H04W 48/16; H04W 48/18
(Continued)

(56) References Cited

U.S. PATENT DOCUMENTS

2012/0322447 A1     12/2012 Ramachandran et al.
2014/0062777 A1*     3/2014 MacGougan ........... G01S 19/07
                                                                342/357.43
(Continued)

FOREIGN PATENT DOCUMENTS

CN     103747469 A     4/2014
CN     103906188 A     7/2014
(Continued)

OTHER PUBLICATIONS

Extended European Search Report in European Appln No. 21813140.7, dated Jun. 27, 2023, 11 pages.
(Continued)

*Primary Examiner* — Joel Ajayi
(74) *Attorney, Agent, or Firm* — Fish & Richardson P.C.

(57)     ABSTRACT
This disclosure provides network search methods and electronic devices. One method includes: A terminal device accesses a network of a first communications radio access technology (RAT), determines that a network anomaly occurs, where the network anomaly includes: no network or a fall into a lower RAT and searches for a network of a target communications RAT, where the target communications RAT is a communications RAT that is not lower than the first communications RAT; and the terminal device is connected to the network of the target communications RAT.

20 Claims, 19 Drawing Sheets

(58) Field of Classification Search
USPC ......................................................... 455/434
See application file for complete search history.

(56) References Cited

U.S. PATENT DOCUMENTS

| | | | |
|---|---|---|---|
| 2014/0194086 | A1 | 7/2014 | Alam et al. |
| 2018/0092006 | A1 | 3/2018 | Sitton et al. |
| 2018/0288492 | A1* | 10/2018 | Sakyu ............. H04N 21/44209 |

FOREIGN PATENT DOCUMENTS

| | | | |
|---|---|---|---|
| CN | 103906189 | A | 7/2014 |
| CN | 103906190 | A | 7/2014 |
| CN | 103906191 | A | 7/2014 |
| CN | 103906195 | A | 7/2014 |
| CN | 103906196 | A | 7/2014 |
| CN | 104350784 | A | 2/2015 |
| CN | 105873145 | A | 8/2016 |
| CN | 105939525 | A | 9/2016 |
| CN | 106714134 | A | 5/2017 |
| CN | 108235828 | B | 12/2020 |
| CN | 112261701 | A | 1/2021 |
| CN | 112333791 | A | 2/2021 |

OTHER PUBLICATIONS

International Search Report and Written Opinion in International Appln. No. PCT/CN2021/083541, mailed on Jun. 7, 2021, 21 pages (with English translation).

* cited by examiner

S101

A terminal device determines that a network anomaly occurs

S102

The terminal device searches for and accesses a target network

Driving route

Exit parameter

Input parameter:
sensor data

Algorithm
model

Output parameter:
exit/non-exit

A terminal device determines that a network anomaly occurs    S901

Determine that the terminal device is in an underground garage scenario    S902

Determine whether the terminal device exits    S903

Yes

Search for a target network based on a first network search mechanism and access the target network    S904

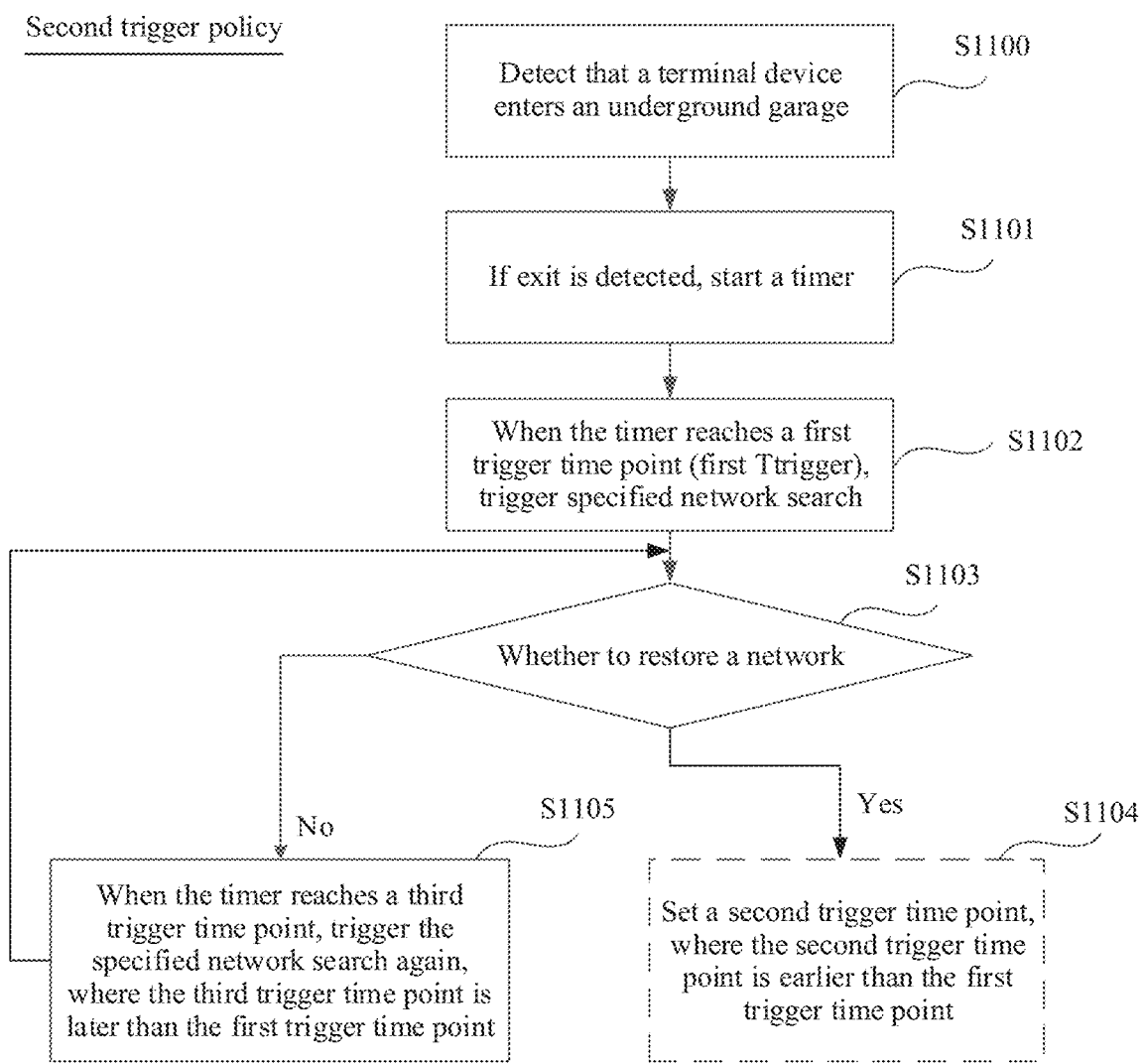

Second trigger policy

Detect that a terminal device enters an underground garage   S1100

If exit is detected, start a timer   S1101

When the timer reaches a first trigger time point (first Ttrigger), trigger specified network search   S1102

Whether to restore a network   S1103

No   S1105

Yes   S1104

When the timer reaches a third trigger time point, trigger the specified network search again, where the third trigger time point is later than the first trigger time point Set a second trigger time point, where the second trigger time point is earlier than the first trigger time point

FIG. 11

NETWORK SEARCH METHOD AND ELECTRONIC DEVICE

CROSS REFERENCE TO RELATED APPLICATIONS

This application is a national stage of International Application No. PCT/CN2021/083541, filed on Mar. 29, 2021, which claims priority to Chinese Patent Application No. 202010459949.3, filed on May 27, 2020 and Chinese Patent Application No. 202010623919.1, filed on Jun. 30, 2020. All of the aforementioned applications are incorporated herein by reference in their entireties.

TECHNICAL FIELD

This application relates to the field of communication technologies, and in particular, to a network search method and an electronic device.

BACKGROUND

Currently, although network coverage is relatively comprehensive, there are still many areas with no network coverage or weak coverage, for example, an underground garage or an area with weak coverage or no coverage on a driving route. In these areas, a terminal is easily dropped from a network, easily falls into a lower RAT, or the like.

An underground garage is used as an example. It is assumed that a terminal device is dropped from a 4G network after entering the underground garage (entry). When the terminal device moves out of the underground garage (exit), the terminal device needs to perform network search and registration again. After performing network search and registration again, the terminal device may camp on a low-RAT base station, for example, a 3G base station. In other words, the terminal device is in 4G during entry, but falls into a 3G RAT during exit. Moreover, it may take a long time for the terminal device to restore to 4G after exit. Consequently, user experience is affected.

SUMMARY

An objective of this application is to provide a network search method and an electronic device, so that a terminal can be restored to a high-RAT network in a timely manner after the terminal is dropped from the network or falls into a lower RAT.

According to a first aspect, an embodiment of this application provides a network search method. The method may be implemented by a terminal device such as a mobile phone or a tablet computer. The method includes: The terminal device accesses a network of a first communications RAT; the terminal device determines that a network anomaly occurs, where the network anomaly includes: no network or a fall into a lower RAT; the terminal device searches for a network of a target communications RAT, w % here the target communications RAT is not lower than the first communications RAT; and the terminal device is connected to the network of the target communications RAT.

Therefore, in this embodiment of this application, when the terminal device is dropped from a network or falls into a lower RAT, the terminal device may perform specified network search. The specified network search is to search for the network of the target communications RAT, for example, search for only the network of the target communications RAT, so that the terminal device is restored to a high-RAT network as soon as possible.

In a possible design, when the terminal device is in a connected mode, the terminal device searches for a prestored first cell. A communications RAT of the first cell is the target communications RAT, the first cell is not completely the same as a second cell, the second cell is a neighboring cell that is of a third cell and that is configured by a network device, and the third cell is a cell connected to the terminal device when the terminal device falls into a lower RAT.

In other words, when the terminal device falls into a lower RAT (in a connected mode), the terminal device searches for the prestored first cell, and may not search for the second cell. This is because the second cell is a neighboring cell that is of a cell (namely, the third cell) and that is configured by the network device when the terminal device falls into a lower RAT, and the second cell may not be a cell of the target RAT. Therefore, in this way, a network search capability of the terminal device is expanded, and not only the neighboring cell of the third cell is searched, so that the terminal device can be restored to a high RAT as soon as possible.

In a possible design, the first cell is a cell found in a historical network search process of the terminal device. For example, a same scenario such as no network/a fall into a lower RAT historically occurs on the terminal device. In this scenario, if a cell corresponding to the network of the target RAT that is found by the terminal device is a cell 1, the first cell is the cell 1.

In a possible design, that the terminal device searches for a network of a target communications RAT includes. When the terminal device is in an idle mode, the terminal device searches for the network of the target RAT every preset time interval.

In the conventional technology, after being dropped from a network, the terminal device immediately performs network search. If no network is found, the terminal device waits for 1 s and continues to perform network search. If still no network is found, the terminal device waits for 2 s and continues to perform network search. Time intervals gradually increase. In this embodiment of this application, when the terminal device is dropped from a network (in an idle mode), the terminal device searches for the network of the target RAT every preset time interval. This improves a possibility of finding the network of the target RAT.

In a possible design, that the terminal device searches for a network of a target communications RAT includes: starting to search for the network of the target communications RAT at a first time point. There is a first time interval between the first time point and a second time point, the second time point is a time point at which the terminal device is dropped from a network or falls into a lower RAT, the first time point is a time point after the second time point, and the first time interval is greater than or equal to 5 s.

In this embodiment of this application, after the terminal device is dropped from a network or falls into a lower RAT, the terminal device does not need to immediately search for the network of the target communications RAT, but starts network search at the first time point, so that power consumption can be reduced to some extent. The first time point may be an optimal network search time obtained by the terminal device through self-learning. There is a relatively high probability that the terminal device performs network search at the first time point to access the network of the target RAT. In other words, the terminal device does not need to continuously perform network search and may start network search at a relatively accurate network search time point, and a probability of accessing the network of the target RAT is relatively high.

In a possible design, that the terminal device searches for a network of a target communications RAT includes: If the terminal device is in an underground garage scenario, the terminal device starts to search for the network of the target communications RAT at a third time point. There is a second time interval between the third time point and a fourth time point, the fourth time point is a time point at which the terminal device leaves an underground garage, the third time point is a time point after the fourth time point, and the second time interval is greater than or equal to 5 s.

In this embodiment of this application, in the underground garage scenario, after the terminal device is dropped from a network or falls into a lower RAT, the terminal device does not need to immediately search for the network of the target communications RAT, but starts network search at the third time point. This can reduce power consumption to some extent. In addition, the third time point is after an exit time point (the fourth time point), so that a probability of finding the network of the target RAT can be improved.

In a possible design, that the terminal device searches for a network of a target communications RAT includes: determining whether the terminal device is in an underground garage scenario. If the terminal device is not in the underground garage scenario, the terminal device starts to search for the network of the target communications RAT at a first time point. There is a first time interval between the first time point and a second time point, the second time point is a time point at which the terminal device is dropped from a network or falls into a lower RAT, and the first time point is a time point after the second time point. If the terminal device is in the underground garage scenario, the terminal device starts to search for the network of the target communications RAT at a third time point. There is a second time interval between the third time point and a fourth time point, the fourth time point is a time point at which the terminal device leaves the underground garage, and the third time point is a time point after the fourth time point. The first time interval is greater than or equal to 5 s, and/or the second time interval is greater than or equal to 5 s.

In this embodiment of this application, the terminal device may perform scenario identification, and determine whether the scenario is the underground garage scenario or a non-underground garage scenario. Different network search mechanisms are used in different scenarios. In the underground garage scenario, the terminal device starts network search at the third time point (after an exit time point). In the non-underground garage scenario, the terminal device performs network search at the first time point (after a time point of no network or a fall into a lower RAT). Different network search mechanisms are used in different scenarios, and this is relatively flexible.

In a possible design, the starting to search for the network of the target communications RAT at a first time point includes: if the network anomaly is no network, starting to search for the network of the target communications RAT at the first time point; and/or that the terminal device searches for the network of the target communications RAT at a third time point includes: if the network anomaly is no network, starting to search for the network of the target communications RAT at the third time point.

In the conventional technology, a terminal device immediately performs network search after being dropped from a network. In this embodiment of this application, after being dropped from a network, the terminal device performs network search at the first time point (in the non-underground garage scenario) or the third time point (in the underground garage scenario), so that network search does not need to be immediately performed, and power consumption is reduced. The first time point or the third time point is an optimal network search time point obtained by the terminal device through self-learning, and a probability of finding the network of the target RAT at the optimal network search time point is relatively high. In other words, the terminal device does not need to continuously perform network search and may start network search at a relatively accurate network search time point, and a probability of accessing the network of the target RAT is relatively high.

In a possible design, before that the terminal device searches for a network of a target communications RAT, the method further includes: the terminal device determines at least one target communications RAT based on the first communications RAT.

In this embodiment of this application, after the terminal device is dropped from a network or falls into a lower RAT, the terminal device may search for any RAT that is not lower than the first communications RAT, or may search for a fixed communications RAT, for example, search for a 4G or 5G RAT. Therefore, before searching for the network of the target communications RAT, the terminal device determines the target communications RAT based on the first communications RAT. When the terminal device searches for any RAT that is not lower than the first communications RAT, it can be ensured that the terminal device is restored to a high-RAT network, and power consumption can be further reduced.

In a possible design, that the terminal device searches for a network of a target communications RAT includes: The terminal device searches for the network of the target communications RAT after the terminal device falls into a lower RAT and when the terminal device is connected to a cell that is connected by the terminal device when the terminal device falls into a lower RAT.

In this embodiment of this application, after the terminal device falls into a lower RAT, the terminal device can immediately search for the network of the target RAT when the terminal device keeps connected to the cell that is connected by the terminal device when the terminal device falls into a lower RAT. In this way, in a process of the terminal device from falling into a lower RAT and being restored to a high-RAT network, the terminal device does not access another low-RAT cell. This saves time and ensures that the high-RAT network is restored as soon as possible.

In a possible design, that the terminal device searches for a network of a target communications RAT includes: The terminal device searches for the network of the target communications RAT, and does not search for a network of a communications RAT other than the target communications RAT; or the terminal device searches for the network of the target communications RAT at least twice continuously; or the terminal device searches for the network of the target communications RAT at a same frequency within a preset time period.

In the conventional technology, after the terminal device is dropped from a network or falls into a lower RAT, the terminal device searches for a network of any RAT. Usually, the terminal device first searches for a high RAT and then searches for a lower RAT. For example, the terminal device first searches for 5G and then searches for 4G. In addition, a frequency used for searching for 5G is different from a frequency used for searching for 4G. Therefore, in this embodiment of this application, the terminal device searches for only the network of the target RAT, and does not search for a network of another RAT, to ensure that the terminal device is restored to the high-RAT network as soon as possible. Specifically, the terminal device may search for the network of the target communications RAT at least twice continuously, instead of first searching for a high RAT and then searching for a lower RAT. Alternatively, the terminal device searches for a network at a same frequency within a preset time period. For example, if a frequency corresponding to the target RAT is a frequency 1, the terminal device searches for the network of the target RAT by using the frequency 1 within the preset time period. In other words, after being dropped from a network or falling into a lower RAT, the terminal device directly searches for the network of the target communications RAT, and does not search for the network of another RAT.

Certainly, after the preset time period, if the terminal device does not find the network of the target communications RAT, the terminal device searches for a low-RAT network.

In a possible design, that the terminal device searches for the network of the target communications RAT, and does not search for a network of a communications RAT other than the target communications RAT includes: The terminal device adjusts a radio frequency to a frequency corresponding to the target communications RAT, and does not switch the radio frequency to a frequency other than the frequency corresponding to the target communications RAT; and/or the terminal device controls a network search function for the target communications RAT to be in an enabled state, and a search function for another target communications RAT to be in a disabled state.

For example, the terminal device may search for only the network of the target communications RAT in at least one of the following manner 1 or manner 2. In the manner 1, the terminal device may adjust the radio frequency to the frequency corresponding to the target communications RAT, and does not switch the radio frequency to a frequency other than the frequency corresponding to the target communications RAT, that is, adjusts a search frequency to the frequency corresponding to the target communications RAT. In the manner 2, the terminal device controls the network search function used to search for the target communications RAT to be in an enabled state, and a search function for another target communications RAT to be in a disabled state. For example, the terminal device includes a plurality of modem modules, and different modem modules are configured to search for networks of different communications RATs. For example, a first modem module is configured to search for a 3G-RAT network, and a second modem module is configured to search for a 4G-RAT network. When the target communications RAT is a 4G RAT, the terminal device searches for a 4G cell by using the second modem model, and may disable the first modem module. Generally, the two manners may be combined for use.

In a possible design, that the terminal device searches for a network of a target communications RAT includes: If the terminal device is in a screen-on state when being dropped from a network or falling into a lower RAT, the terminal device searches for the network of the target communications RAT.

Therefore, in this embodiment of this application, when the network anomaly occurs on the terminal device, if it is determined that the terminal device is in a screen-on state, the terminal device searches for the network of the target RAT. Usually, when the terminal device is in a screen-off state, it indicates that a user currently does not operate the terminal device, and the terminal device may not need to search for the network of the target RAT. This reduces power consumption.

In a possible design, that the terminal device searches for a network of a target communications RAT includes: determining whether the terminal device is in a call state. If the terminal device is in a call state, the terminal device searches for the network of the target communications RAT after a call ends.

Therefore, when the terminal device is in a call state, a possibility that a user uses a network is relatively low, so that the terminal device may wait until the call ends and search for the network of the target communications RAT, to reduce power consumption.

In a possible design, a place at which the network anomaly occurs on the terminal device is a first place, and first duration is duration between a time point at which the terminal device is connected to the network of the target communications RAT and a time point at which the network anomaly occurs on the terminal device. After that the terminal device is connected to the network of the target communications RAT, the method further includes: controlling the terminal device to enter a default network search mode; and when a network anomaly occurs at the first place, controlling the terminal device to reconnect to the network of the target communications RAT after the terminal device performs network search in the default network search mode. Duration between a time point at which the terminal device is reconnected to the network of the target communications RAT and a time point at which the terminal device arrives at the first place again and the network anomaly occurs is second duration. The second duration is less than the first duration, and the terminal device is connected to the target communications RAT.

In this embodiment of this application, the terminal device may include a specified network search mode and the default network search mode. The specified network search mode indicates that the terminal device searches for only the network of the target communications RAT and does not search for the network of another RAT. The default network search mode is an existing network search mechanism, indicating that search is performed based on a neighboring cell list configured by the network device (in a case of a fall into a lower RAT), or indicating that the network of any RAT is searched for or the high-RAT network is first searched for and then the low-RAT network is searched for (in a case of no network). If a network anomaly occurs at a same place, duration in which the terminal device is restored to the high-RAT network when the specified network search mode is used is shorter than duration in which the terminal device is restored to the high-RAT network when the default network search mode is used. Therefore, in this embodiment of this application, after the terminal device is dropped from a network or falls into a lower RAT, the terminal device can be restored to the high-RAT network as soon as possible.

In a possible design, the first time point is before a fifth time point, and the fifth time point is a historical time point at which the terminal device successfully accesses the network of the target communications RAT after the network anomaly occurs.

In this embodiment of this application, the first time point may be an optimal network search time point obtained by the terminal device through self-learning, and the first time point is after the second time point of no network or a fall into a lower RAT and before the fifth time point. Therefore, the terminal device does not need to continuously perform network search, and may start network search at a relatively accurate network search time point, and a probability of accessing the network of the target RAT is relatively high.

In a possible design, the first time point is a time point between a historical maximum failure time point and a historical minimum success time point. The historical minimum success time point is the earliest historical moment at which the terminal device attempts to search for the network of the target communications RAT and successfully finds the network of the target communications RAT after the network anomaly occurs, the historical maximum failure time point is the latest historical moment at which the terminal device attempts to search for the network of the target communications RAT and fails to find the network of the target communications RAT after the network anomaly occurs, the historical minimum success time point is after the historical maximum failure time point and before the fifth time point, and the historical maximum failure time point is after the second time point.

In this embodiment of this application, the first time point may be an optimal network search time point obtained by the terminal device through self-learning, and the optimal network search time point is a time point between the historical maximum failure time point and the historical minimum success time point. Therefore, the terminal device does not need to continuously perform network search, and may start network search at a relatively accurate network search time point, and a probability of accessing the network of the target RAT is relatively high.

In a possible design, the terminal device successfully finds the network of the target communications RAT at a sixth time point; and when it is determined that a time difference between the historical minimum success time point and the historical maximum failure time point is greater than a threshold, the terminal device updates the historical minimum success time point to the sixth time point.

In this embodiment of this application, the terminal device may update the historical minimum success time point, or may update the historical maximum failure time point. The updated historical minimum success time point and the updated historical maximum failure time point may be used to determine an optimal network search time point when a network anomaly occurs next time. In this way, the optimal network search time point may be increasingly accurate, and a probability of finding the network of the target RAT at the optimal network search time point is increasingly high.

In a possible design, the method further includes: When it is detected that the terminal device is currently located in a first fence corresponding to an underground garage, the terminal device determines that the terminal device is in the underground garage scenario; or the terminal device collects motion data, and determines, based on the motion data, that the terminal device is in the underground garage scenario.

In this embodiment of this application, the terminal device may identify the underground garage scenario based on fence detection, or may identify the underground garage scenario by using the motion data. Certainly, the terminal device may further identify the underground garage scenario in another manner. This is not limited in this embodiment of this application.

In a possible design, a time point at which the terminal device leaves the underground garage scenario is an exit time point detected by the terminal device based on currently collected motion data and a historical exit parameter.

The historical exit parameter includes motion data that is historically collected by the terminal device and that is used to represent that the terminal device moves out of the underground garage.

In this embodiment of this application, in the underground garage scenario, the terminal device may detect the exit time point, and perform network search based on the exit time point. In other words, the terminal device does not need to perform network search immediately after being dropped from a network or falling into a lower RAT. This can reduce power consumption to some extent, and can increase a probability of finding the network of the target RAT.

In a possible design, that the terminal device detects the exit time point based on the currently collected motion data and the historical exit parameter includes: The terminal device determines, by using the historical exit parameter, whether a first curve is an exit curve, where the first curve is a curve corresponding to the motion data currently collected by the terminal device; and when it is determined that the first curve is the exit curve, the terminal device determines a climbing stop time point on the first curve as the exit time point. The climbing stop time point is a time point at which a slope change value on the first curve meets a threshold.

Generally, the terminal device may collect a motion curve (a curve corresponding to the collected motion data) in real time. However, whether the curve represents that the terminal device leaves a garage needs to be determined by using the historical exit parameter. When it is determined that the curve is the exit curve, it is considered that the terminal device leaves the garage. In this case, the exit time point is determined based on the curve. For example, the exit time point is the climbing stop time point on the curve. In this manner, the terminal device may determine a relatively accurate exit time point. In this case, when the network search is performed based on the exit time point, there is a relatively high probability of finding the network of the target RAT, and the high-RAT network is restored as soon as possible.

In a possible design, the historical exit parameter includes at least one of the following parameters:

an attitude angle:

a curve of the attitude angle changing with time;

a climbing start time point:

an attitude angle of the terminal device at the climbing start time point and/or a change value of an attitude angle before and after the climbing start time point;

the climbing stop time point;

an attitude angle of the terminal device at the climbing stop time point and/or a change value of an attitude angle before and after the climbing stop time point; and climbing duration, where the climbing duration includes duration from the climbing start time point to the climbing stop time point.

It should be noted that the foregoing several historical exit parameters are merely examples and are not limited, and other parameters that can be used to detect exit may also be used.

In a possible design, a time point at which the terminal device leaves the underground garage scenario is an exit time point detected by the terminal device based on currently collected cell information and historical cell information. The historical cell information includes cell information collected when the terminal device historically moves out of the underground garage.

In this embodiment of this application, an underground garage scenario is used as an example. When the terminal device historically leaves the underground garage scenario, historical cell information is collected, and a collection time point of the historical cell information is recorded. When the cell information currently collected by the terminal device is consistent with the historical cell information, the terminal device determines that the collection time point of the historical cell information is the exit time point, or determines that a time point at which the terminal device collects the current cell information is the exit time point. Therefore, in the underground garage scenario, the terminal device performs network search based on the exit time point, that is, does not need to perform network search immediately after being dropped from a network or falling into a lower RAT. This can reduce power consumption to some extent, and can increase a probability of finding the network of the target RAT.

In a possible design, the cell information includes at least one of cell identifier information, cell signal strength information, or cell signal strength change information. The cell identifier information includes cell identifiers that are of one or more cells and that are detected when the terminal device historically leaves the underground garage scenario; the signal strength information includes cell signal strengths that are of the one or more cells and that are detected when the terminal device historically leaves the underground garage scenario; and the signal strength change information includes a change value between a first signal strength and a second signal strength, the first signal strength is a signal strength that is of a first cell and that is detected within a first preset time period before the terminal device historically leaves the underground garage scenario, and the second signal strength is a signal strength that is of the first cell and that is detected within a second preset time period after the terminal device historically leaves the underground garage scenario.

It should be noted that the foregoing several types of cell information are merely enumerated, but not limited, and other cell information that can be used to detect exit may also be used.

In a possible design, the method further includes: When it is detected that the terminal device is currently located in a second fence corresponding to the non-underground garage scenario, the terminal device determines that the terminal device is not in the underground garage scenario; or the terminal device collects the motion data, and determines, based on the motion data, that the terminal device is not in the underground garage scenario.

In other words, after the terminal device is dropped from a network or falls into a lower RAT, it may be determined, through fence detection or by using motion data, that the terminal device is not in the underground garage scenario. Certainly, another manner in which it can be determined that the terminal device is not in the underground garage scenario may also be used. This is not limited in this embodiment of this application.

In a possible design, the historical exit parameter is a first historical exit parameter in N historical exit parameters, where N is an integer greater than or equal to 2. The first historical exit parameter meets: The terminal device detects the exit time point by using the first historical exit parameter, where a time difference between the exit time point and a network restoration point is less than a preset time difference; or a time difference between the exit time point and a network restoration point is a smallest time difference in N time differences, and each of the N time differences is a time difference between an exit time point detected by the terminal device by using one of the N historical exit parameters and the network restoration time point; and the network restoration time point is a moment at which the terminal device successfully accesses the network of the target communications RAT.

In this embodiment of this application, the terminal device obtains a relatively accurate historical exit parameter through self-learning. In this way, the terminal device can relatively accurately determine an exit time point of the terminal device by using the historical exit parameter obtained through self-learning. Therefore, when network search is performed based on the exit time point, there is a relatively high probability of finding the network of the target RAT, and the high-RAT network is restored as soon as possible.

According to a second aspect, an electronic device is further provided. The electronic device includes:

one or more processors;

a memory; and one or more computer programs, where the one or more computer programs are stored in the memory, the one or more computer programs include instructions, and when the instructions are executed by the electronic device, the electronic device is enabled to perform the method according to the first aspect.

According to a third aspect, an electronic device is further provided. The electronic device includes:

a communications unit, configured to access a network of a first communications RAT; and a processing unit, configured to determine that a network anomaly occurs, where the network anomaly includes: no network or a fall into a lower RAT.

The communications unit is further configured to search for a network of a target communications RAT, and is connected to the network of the target communications RAT. The target communications RAT is a communications RAT that is not lower than the first communications RAT.

For example, the communications unit may be, for example, a modem module. The modem module may be connected to a radio frequency transceiver module (including a receiving module and a sending module), and is configured to receive and send information. The modem module may process information received by the radio frequency transceiver module, or the modem module sends information by using the modem module. The processing unit may be an application processor, a central processing unit, or the like.

In a possible design, the communications unit is specifically configured to: when the terminal device is in a connected mode, prestore a first cell. A communications RAT of the first cell is the target communications RAT, the first cell is not completely the same as a second cell, the second cell is a neighboring cell that is of a third cell and that is configured by a network device, and the third cell is a cell connected to the terminal device when the terminal device falls into a lower RAT.

In a possible design, the first cell is a cell found in a historical network search process of the terminal device.

In a possible design, the communications unit is specifically configured to: when the terminal device is in an idle mode, search for the network of the target RAT every preset time interval.

In a possible design, the communications unit is specifically configured to start to search for the network of the target communications RAT at a first time point. There is a first time interval between the first time point and a second time point, the second time point is a time point at which the terminal device is dropped from a network or falls into a lower RAT, the first time point is a time point after the second time point, and the first time interval is greater than or equal to 5 s.

In a possible design, the communications unit is specifically configured to: if the terminal device is in an underground garage scenario, start to search for the network of the target communications RAT at a third time point. There is a second time interval between the third time point and a fourth time point, the fourth time point is a time point at which the terminal device leaves an underground garage, the third time point is a time point after the fourth time point, and the second time interval is greater than or equal to 5 s.

In a possible design, the processing unit is further configured to determine whether the terminal device is in an underground garage scenario.

The communications unit is specifically configured to: if the terminal device is not in the underground garage scenario, start to search for the network of the target communications RAT at a first time point, where there is a first time interval between the first time point and a second time point, the second time point is a time point at which the terminal device is dropped from a network or falls into a lower RAT, and the first time point is a time point after the second time point; or if the terminal device is in the underground garage scenario, start to search for the network of the target communications RAT at a third time point, where there is a second time interval between the third time point and a fourth time point, the fourth time point is a time point at which the terminal device leaves the underground garage, and the third time point is a time point after the fourth time point. The first time interval is greater than or equal to 5 s, and/or the second time interval is greater than or equal to 5 s.

In a possible design, the starting to search for the network of the target communications RAT at a first time point includes: if the network anomaly is no network, starting to search for the network of the target communications RAT at the first time point; and/or that the terminal device searches for the network of the target communications RAT at a third time point includes: if the network anomaly is no network, starting to search for the network of the target communications RAT at the third time point.

In a possible design, before the communications unit searches for the network of the target communications RAT, the processing unit is further configured to determine at least one target communications RAT based on the first communications RAT.

In a possible design, the communications unit is specifically configured to:

search for the network of the target communications RAT, and not search for a network of a communications RAT other than the target communications RAT; or search for the network of the target communications RAT at least twice continuously; or search for the network of the target communications RAT at a same frequency within a preset time period.

In a possible design, the communications unit is specifically configured to: adjust a radio frequency to a frequency corresponding to the target communications RAT, where the radio frequency is not handed over to a frequency other than the frequency corresponding to the target communications RAT; and/or the processing unit is specifically configured to control a network search function for the target communications RAT to be in an enabled state, and a search function for another target communications RAT to be in a disabled state.

In a possible design, the processing unit is further configured to determine that the terminal device is in a screen-on state when the terminal device is dropped from a network or falls into a lower RAT, and the communications unit searches for the network of the target communications RAT.

In a possible design, the processing unit is further configured to determine whether the terminal device is in a call state.

If the terminal device is in a call state, the communications unit searches for the network of the target communications RAT after a call ends.

In a possible design, a place at which the network anomaly occurs on the terminal device is a first place, and first duration is duration between a time point at which the terminal device is connected to the network of the target communications RAT and a time point at which the network anomaly occurs on the terminal device.

The processing unit is further configured to: control the terminal device to enter a default network search mode; and when the terminal device arrives at the first place again and a network anomaly occurs, control the communications unit to reconnect to the network of the target communications RAT after the communications unit performs network search in the default network search mode, where duration between a time point at which the terminal device is reconnected to the network of the target communications RAT and a time point at which the terminal device arrives at the first place again and the network anomaly occurs is second duration, and the second duration is greater than the first duration.

According to a fourth aspect, a chip is further provided. The chip is coupled to a memory in an electronic device, and is configured to invoke a computer program stored in the memory, to perform the method according to the first aspect.

According to a fifth aspect, a computer-readable storage medium is further provided, including instructions. When the instructions are run on an electronic device, the electronic device is enabled to perform the method according to the first aspect.

According to a sixth aspect, a computer program product is further provided, including instructions. When the instructions are run on a computer, the computer is enabled to perform the method according to the first aspect.

For beneficial effects of the second aspect to the sixth aspect, refer to descriptions of beneficial effects of the first aspect. Details are not described again.

BRIEF DESCRIPTION OF DRAWINGS

FIG. 11 is a schematic diagram of another network search method in an underground garage scenario according to an embodiment of this application;

DESCRIPTION OF EMBODIMENTS

Figure 1:
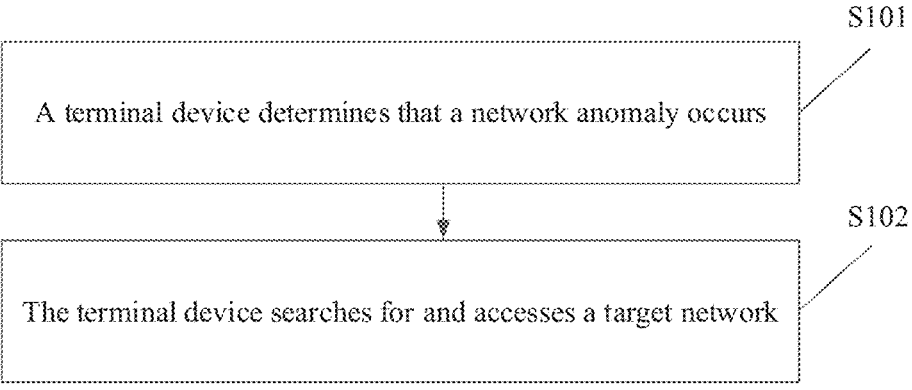
FIG. 1 is a schematic diagram of a network search method according to an embodiment of this application.

The following first explains and describes some terms in embodiments of this application, to facilitate understanding by a person skilled in the art.

(1) Terminal device: The terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (radio access network, RAN), and exchange a voice or data with the RAN, or interact a voice and data with the RAN. The terminal device may include user equipment (user equipment, UE), a wireless terminal device, a mobile terminal device, a device-to-device (device-to-device, D2D) terminal device, a vehicle-to-everything (vehicle to everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, a portable, pocket-sized, handheld, or computer built-in mobile apparatus, or the like. For example, it may be a device such as a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with relatively low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (on-board unit, OBU).

In embodiments of this application, the terminal device may further include a relay (relay). Alternatively, it is understood as that any device that can perform data communication with a base station may be considered as a terminal device.

In embodiments of this application, an apparatus configured to implement a function of the terminal device may be a terminal device, or may be an apparatus, for example, a chip system, that can support the terminal device in implementing the function. The apparatus may be mounted in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal device.

(2) Network device: The network device includes, for example, an access network (access network. AN) device such as a base station (for example, an access point), and may be a device that is in an access network and that communicates with a wireless terminal device over an air interface by using one or more cells. Alternatively, the network device is, for example, a road side unit (road side unit, RSU) in a vehicle-to-everything (vehicle-to-every-thing, V2X) technology. The base station may be configured to mutually convert a received over-the-air frame and an IP packet, and serve as a router between a terminal device and a remaining part of an access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in an LTE system or a long term evolution-advanced (long term evolution-advanced, LTE-A) system, or may include a next generation NodeB (next generation node B, gNB) in a fifth generation (the 5th generation, 5G) mobile communications technology NR system (also referred to as an NR system for short), or may include a central unit (centralized unit, CU) and a distributed unit (distributed unit, DU) in a cloud radio access network (cloud radio access network, Cloud RAN) system. This is not limited in embodiments of this application.

The network device may further include a core network device. In embodiments of this application, the core network device includes, for example, an access and mobility management function (access and mobility management func-tion. AMF) or a user plane function (user plane function, UPF) in a 5G system, or includes a mobility management entity (mobility management entity, MME) in a 4G system.

In embodiments of this application, an apparatus config-ured to implement a function of a network device may be a network device, or may be an apparatus, for example, a chip system, that can support the network device in implementing the function. The apparatus may be installed in the network device. The technical solutions provided in embodiments of this application are described by using an example in which the apparatus configured to implement the function of the network device is the network device.

(3) Radio resource control (radio resource control, RRC): In LTE, two RRC modes are supported: an RRC idle mode (RRC_IDLE) and an RRC connected mode (RRC_CON-NECTED). In NR, an RRC inactive mode (RRC_INAC-TIVE) is introduced. To be specific, in NR, three modes are supported: an RRC idle mode (RRC_IDLE), the RRC inac-tive mode (RRC_INACTIVE), and an RRC connected mode (RRC_CONNECTED). Different RRC modes can be switched with each other.

(4) Communications RAT: The communications RAT includes but is not limited to a second generation mobile communication technology (2nd-Generation wireless tele-phone technology, 2G) network, a third generation mobile communication technology (3rd-Generation wireless tele-phone technology, 3G) network, a fourth generation mobile communication technology (4th-Generation wireless tele-phone technology, 4G) network, a fifth generation mobile communication technology (5th-Generation wireless tele-phone technology, 5G) network, and the like, for example, a global system for mobile communications (global system of mobile communication, GSM) network, a code division multiple access (code division multiple access, CDMA) network, a wideband code division multiple access (wide-band code division multiple access, WCDMA) network, a universal mobile telecommunications system (universal mobile telecommunications system, UMTS) network, and a long term evolution (long term evolution, LTE) network.

(4.1) Fall into a lower RAT: The fall into a lower RAT means that a terminal device is handed over from a high communications RAT to a low communications RAT, for example, from 5G to 4G or 3G, from 4G to 3G, or from 5G to 3G or 4G.

The terminal device is always in a connected (connected) mode before and after falling into a lower RAT. For example, the terminal device is handed over from 5G to 4G. A process of a fall into a lower RAT includes: The terminal device camps on a 5G base station, that is, a current communications RAT of the terminal device is 5G. When a handover condition is met, the terminal device performs cell handover, for example, is handed over to a 4G base station. In this case, the terminal device falls from 5G to 4G, and the terminal device is always in a connected (connected) mode in a process of falling from 5G to 4G. For example, the handover condition may be: the terminal device detects that the terminal device moves out of a coverage area of the 5G base station (for example, a signal strength of the 5G base station is lower than a threshold), the terminal device detects that a signal strength of the 4G base station is greater than a threshold, for example, greater than a signal strength of the 5G base station, or the like.

(4.2) No network: The no network means that a terminal device changes from having a network to having no net-work. Different from that in a fall into a lower RAT, before the no network, the terminal device is in a connected (connected) mode, and after the no network, the terminal device is in an idle (idle) mode. After the terminal device is dropped from a network, if the terminal device needs to restore the network, a network search and registration pro-cess needs to be performed. In short, the network search and registration process may specifically include a network search process and a network registration process. In the network search process, the terminal device performs cell search, and performs the network registration process after finding a suitable cell. In the network registration process, the terminal device sends identity information (for example, identity information of a SIM card) to a network device, and the network device verifies validity of the identity informa-tion, and after verifying that the identity information is valid, allows the terminal device to camp on the cell.

(5) Mobility management mechanism of a terminal: Cell handover (handover) or cell reselection (reselection) are performed, so that continuous services of a wireless network are obtained. The cell handover means that a terminal device in a connected (connected) mode is handed over from a current cell to another cell through neighboring cell mea-surement. The cell reselection is a process in which a terminal device in an RRC_IDLE mode monitors signal quality of surrounding cells to select a best cell to provide a network service. Therefore, a terminal device that falls into a lower RAT may be handed over to a high-RAT cell in a cell handover manner, and a terminal device that is dropped from a network may access a high-RAT cell in a cell reselection manner.

The cell handover is used as an example. A cell handover process includes: The terminal device accesses a first cell, and the first cell may configure, by using RRC signaling (used to indicate a time-frequency resource for performing neighboring cell measurement), the terminal device to perform neighboring cell measurement. The terminal device reports a measurement result of a neighboring cell to the first cell. When it is determined, based on the measurement result, that a handover condition is met (for example, signal quality of the neighboring cell is higher than that of the first cell), the first cell hands over the terminal device to a cell with better signal quality. Alternatively, after accessing the first cell, the terminal device may perform neighboring cell measurement, and is handed over to a neighboring cell when detecting that a handover condition is met. The handover condition includes that signal quality of the first cell is lower than a specific threshold, signal quality of the neighboring cell is higher than a threshold, or the like.

It may be understood that the foregoing cell reselection or cell handover process is performed based on a measurement result of a neighboring cell.

(6) Neighboring cell measurement: A terminal device measures related information of a neighboring cell, to obtain a result that serves as a basis for cell handover or cell reselection. The related information of the neighboring cell includes a communications RAT, a target frequency, a physical cell identifier (physical cell identifier, PCI), a signal strength, and the like of the neighboring cell.

(7) Terms: In embodiments of this application, "a plurality of" means two or more. In view of this, in embodiments of this application, "a plurality of" may also be understood as "at least two". "At least one" may be understood as one or more, for example, one, two, or more. For example, "including at least one" means including one, two, or more, and does not limit which items are included. For example, if at least one of A, B, and C is included, A, B, C. A and B, A and C, B and C, or A, B, and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects.

When a terminal device moves, a network anomaly (no network or a fall into a lower RAT) may occur. For example, when the terminal device enters an underground garage or passes a problem area (an area with weak network coverage or no coverage) on a driving route of a vehicle, a network anomaly occurs. To avoid impact on a service of the terminal device, once a network anomaly occurs, the terminal device attempts to restore the network as soon as possible.

A fall into a lower RAT is used as an example. An existing network search solution is as follows: It is assumed that after the terminal device accesses a first cell (4G cell), the terminal device is handed over from the first cell to a second cell (3G cell), that is, the terminal device falls into a lower RAT (the terminal device is in a connected mode). The terminal device may detect a plurality of neighboring cells of the second cell, and when the handover condition (referring to the foregoing description) is met, the terminal device accesses one of the plurality of neighboring cells. Generally, the terminal device performs neighboring cell measurement based on a neighboring cell list configured by a network device. For example, if the neighboring cell list includes three cells, the terminal device searches only the three cells. In other words, in this solution, after the terminal device falls into a lower RAT, cells that can be searched are limited, and a cell that is not in the neighboring cell list cannot be searched. Therefore, there is a case in which the neighboring cell list configured by the terminal device does not include a high-RAT cell such as the 4G cell. In this way, after performing neighboring cell measurement based on the neighboring cell list, the terminal device can access only a low-RAT neighboring cell. If the terminal device wants to be restored to a 4G RAT, the terminal device needs to continue to perform neighboring cell measurement in the neighboring cell, and when the handover condition is met, perform a cell handover process again. It can be learned that the terminal device needs a relatively long time to restore to a high-RAT (original 4G) network.

In the foregoing existing solution, a change of a communications RAT identifier on a GUI in a process in which the terminal device falls into a lower RAT is as follows: Assuming that the terminal device falls from 4G to 3G, the communications RAT identifier displayed on the GUI of the terminal device changes from 4G to 3G. Then, the terminal device searches for a cell in the neighboring cell list. Assuming that another 3G cell is found, the terminal device accesses the 3G cell, 3G is still displayed on the GUI, and 4G is displayed on a status bar on the GUI until the terminal device finds a 4G cell at a specific moment. Therefore, a display change of the communications RAT identifier on the GUI is from 4G to 3G and then to 4G. It takes a relatively long time to display 3G, because the terminal device may be handed over to different 3G cells in a process of continuously displaying 3G. For a manner of displaying the communications RAT identifier on the GUI of the terminal device, refer to FIG. 2($a$), FIG. 2($b$), FIG. 2($c$), and FIG. 2($d$) below.

A no network is used as an example. An existing network search solution is as follows: After the terminal device is dropped from a network, the terminal device needs to perform network re-search. The network re-search is to continuously search for a network from a moment when the network is dropped from a network, and search for a network of any RAT. For example, from a time point at which a network is dropped from, the first network search is performed after 1 s; if no network is found, the second network search is performed after 2 s, and then, the third network search is performed after 3 s. That is, a time interval for each wait is different and gradually increases. When a cell is found, the terminal device accesses the cell. In one case, a found communications RAT is random. Assuming that a low-RAT base station such as a 3G base station is first found, the terminal device needs to perform a cell handover process before being handed over to a high-RAT cell. However, if a configured neighboring cell list does not include the high-RAT cell, the terminal device still cannot be restored to the high-RAT cell in a timely manner. In another case, after being dropped from 4G, the terminal device first searches for a high-RAT network, and then searches for a low-RAT network. Because the terminal device is in a motion state, the terminal device may miss searching for the high-RAT network, and therefore cannot be restored to the high-RAT network in a timely manner.

In the foregoing existing solution, a change of a communications RAT identifier on a GUI in a process in which the terminal device is dropped from a network is as follows: Assuming that the terminal device is dropped from 4G, the communications RAT identifier displayed on the GUI of the terminal device changes from 4G to no signal. Then, the terminal device searches for a cell. Assuming that a 3G cell is found, the terminal device accesses the 3G cell. In this case, 3G is displayed on the GUI, and 4G is displayed on a status bar on the GUI until the terminal device finds a 4G cell at a specific moment and accesses the 4G cell. Therefore, after no network, a display change of the communications RAT identifier on the GUI is from 4G to no signal, then to 3G, and then to 4G. Therefore, it takes a relatively long time for the terminal device to restore to 4G after being dropped from a network.

Therefore, in the current solution, after a network anomaly occurs on the terminal device, there is a problem that a high-RAT network cannot be restored in time.

In view of this, an embodiment of this application provides a network search method. In the method, after a network anomaly occurs on a terminal device, the terminal can be restored to a high-RAT network as soon as possible.

The following describes the technical solutions in this application with reference to the accompanying drawings.

Embodiment 1

FIG. 1 is a schematic diagram of a network search method according to an embodiment of this application. A procedure of the method includes the following steps.

S101: A terminal device determines that a network anomaly occurs.

The network anomaly may include no network or a fall into a lower RAT. It is assumed that the terminal device accesses a first cell, and a communications RAT of the first cell is a first communications RAT. The no network includes: The terminal device is handed over from the first cell to a state in which no cell is accessed. The fall into a lower RAT includes: The terminal device is handed over from the first cell to a second cell, a communications RAT of the second cell is a second communications RAT, and the second communications RAT is lower than the first communications RAT. For example, the first communications RAT is 5G, and the second communications RAT is 3G or 4G. Alternatively, the first communications RAT is 4G, the second communications RAT is 3G, or the like.

Figures 2A, 2B:
FIG. 2(a), FIG. 2(b), FIG. 2(c), and FIG. 2(d) are schematic diagrams of graphical user interfaces of a terminal device according to an embodiment of this application.
Figures 2C, 2D:

After the terminal device is dropped from a network or falls into a lower RAT, a graphical user interface (graphical user interface, GUI) changes. For example, the terminal device is dropped from a network. Refer to FIG. 2(*a*), the terminal device accesses the first cell, for example, a 4G cell, and a communications RAT identifier 201 displayed on a status bar is a 4G identifier. After the terminal device is dropped from a network, "no signal" is displayed on the status bar. Refer to FIG. 2(*b*). For example, the terminal device falls into a lower RAT. Refer to FIG. 2(*c*), the terminal device accesses the first cell, for example, a 4G cell, and a communications RAT identifier 203 displayed on a status bar is a 4G identifier. When the terminal device is handed over from the first cell to the second cell, for example, a 3G cell, a communications RAT identifier 204 displayed on the status bar is a 3G identifier. Refer to FIG. 2(*d*).

S102: The terminal device searches for and accesses a target network.

In this embodiment of this application, that the terminal device searches for a target network includes at least one of the following cases:

1. The terminal device searches for a network whose communications RAT is a target communications RAT.

The target communications RAT is any RAT higher than or equal to the first communications RAT. For example, the first communications RAT is 5G, and the target communications RAT is 5G; or the first communications RAT is 4G, and the target communications RAT is 4G or 5G; or the first communications RAT is 3G, and the target communications RAT is 3G, 4G, or 5G.

Alternatively, the target communications RAT is a preset communications RAT, for example, 4G. In other words, the terminal device searches for and accesses only a 4G cell.

In this embodiment of this application, that the terminal device searches for the network of the target communications RAT means that the terminal device searches for only the network of the target communications RAT. Specifically, the terminal device searches for the network of the target communications RAT and does not search for a network of a RAT other than the target communications RAT. For example, the terminal device may search for only the network of the target communications RAT in at least one of the following manner 1 or manner 2. In the manner 1, the terminal device may adjust a radio frequency to a frequency corresponding to the target communications RAT, and does not switch the radio frequency to a frequency other than the frequency corresponding to the target communications RAT, that is, adjusts a search frequency to the frequency corresponding to the target communications RAT. In the manner 2, the terminal device controls the network search function used to search for the target communications RAT to be in an enabled state, and a search function for another target communications RAT to be in a disabled state. For example, the terminal device includes a plurality of modem modules, and different modem modules are configured to search for networks of different communications RATs. For example, a first modem module is configured to search for a 3G-RAT network, and a second modem module is configured to search for a 4G-RAT network. When the target communications RAT is a 4G RAT, the terminal device searches for a 4G cell by using the second modem model, and may disable the first modem module. Generally, the two manners may be combined for use.

Alternatively, that the terminal device searches for only the network of the target communications RAT may be understood as that after the terminal device is dropped from a network or falls into a lower RAT, the terminal device searches for only the network of the target communications RAT, and does not search for a network of another RAT (before a high target RAT is restored).

The foregoing process of searching for and accessing the network of the target communications RAT includes a process of searching for the network of the target communications RAT and a process of accessing the network of the target communications RAT. The process of searching for the network of the target communications RAT includes: An application processor AP sends a network search instruction to a modem module, where the network search instruction may be used to instruct the modem to specifically search for the network of the target RAT, for example, search for a 3G RAT or a 4G RAT. The modem module starts to perform network search. For example, the modem module in the terminal device receives broadcast messages sent by a plurality of cells. The broadcast messages include pilot codes, synchronization information, and the like. The terminal device synchronizes, based on the synchronization information, with a target cell corresponding to the network of the target communications RAT, and then accesses the target cell. Because the radio frequency of the terminal device is adjusted to the frequency corresponding to the target communications RAT, the terminal device can find the broadcast message of the cell corresponding to the network of the target communications RAT, but cannot find a broadcast message of a cell corresponding to a network of a non-target communications RAT. Therefore, the terminal device only needs to synchronize with the cell corresponding to the network of the target communications RAT.

A process of accessing the network of the target communications RAT (or a connection process) includes: The modem module sends an access request (connection request) message to the target cell corresponding to the network of the target communications RAT; if the target cell agrees to access, a link answer (connection setup) message is sent to the modem module; and the modem module sends an access complete (connection setup complete) message to the target cell, that is, the terminal device accesses the target cell. In this case, a subsequent network service of the terminal device is provided by the target cell.

2. The terminal device searches for a target cell, where the target cell is a cell that has been accessed and that is recorded by the terminal device.

For example, a same scenario has occurred on the terminal device historically. In this scenario, if the terminal device accesses a third cell, the target cell is a third cell. The same scenario that has occurred historically may be understood as follows: Assuming that the network anomaly (in S101) indicates that the terminal device is handed over from the first cell to the second cell (a RAT of the second cell is lower than that of the first cell), the same scenario that has occurred historically is a scenario in which the terminal device has been handed over from the first cell to the second cell. Assuming that in the same scenario that has occurred historically, the terminal device searches for and accesses the third cell (a RAT of the third cell is not lower than that of the first cell). In this case, the terminal device searches for and accesses the third cell, that is, the target cell is the third cell. Certainly, if the terminal device finds a neighboring cell whose communications RAT is higher than that of the third cell, the terminal device may access the neighboring cell.

For example, a network anomaly occurs in a process in which the terminal device enters an underground garage. The terminal device may record a cell (whose communications RAT is higher than a cell accessed before the terminal device falls into a lower RAT) accessed when the terminal device moves out of the underground garage. In this case, when detecting that the terminal device moves out of the underground garage again, the terminal device may access the recorded cell.

Specifically, the terminal device may record a cell identifier of each accessed cell, and the cell identifier includes but is not limited to a PCI. The terminal device records, as a target PCI, a PCI of a cell accessed in the same scenario that has occurred historically. The terminal device performs neighboring cell measurement, and detects neighboring cell information of a plurality of neighboring cells. Neighboring cell information of each neighboring cell includes a PCI of each neighboring cell. Assuming that a PCI of a first neighboring cell in the plurality of neighboring cells is the target PCI, the terminal device accesses the first neighboring cell.

3. The terminal device searches for a target cell, where the target cell is a cell having a target frequency. Assuming that an operating frequency before the terminal device is dropped from a network or falls into a lower RAT is a first frequency, the target cell may be a cell whose operating frequency is higher than or equal to the first frequency, that is, the terminal device accesses a cell whose operating frequency is higher than or equal to the first frequency.

In some embodiments, the foregoing three conditions may alternatively be used in combination. For example, when determining that there are a plurality of target cells that meet a target communications RAT, the terminal device may determine, from the plurality of target cells, that a PCI is a target PCI (a PCI of a cell that has been accessed historically); and/or determine, from the plurality of target cells, a cell having a target frequency.

Further, the terminal device may further select a target cell with reference to other information. For example, when determining that there are a plurality of target cells that meet a target communications RAT, the terminal device may select, from the plurality of target cells, a cell with a highest communications RAT or a cell with a strongest signal strength as a final target cell. For another example, when determining that there are a plurality of recorded cells that have been accessed, the terminal device determines a cell with a largest quantity of access times or a cell with a strongest signal strength as the final target cell. For another example, if the terminal device determines that there are a plurality of cells having a target frequency, the terminal device determines a cell with a strongest signal strength as a final target cell. Alternatively, when determining that there are a plurality of target cells that meet a target communications RAT, the terminal device may select a cell with a highest communications RAT from the plurality of target cells. When there are a plurality of cells with a highest communications RAT, the terminal device selects a cell with a highest signal strength from the plurality of target cells as a final target cell.

Considering that a network anomaly may include two cases: no network and a fall into a lower RAT, the following separately describes a network search mechanism in the two cases.

Case 1: A fall into a lower RAT is used as an example.

After the terminal device is handed over from the first cell to the second cell (the communications RAT of the second cell is lower than the communications RAT of the first cell), the terminal device searches for the network of the target communications RAT. The target communications RAT is a communications RAT that is not lower than the first communications RAT. In this manner, after falling into a lower RAT, the terminal device searches for the network of the target communications RAT. A cell corresponding to the searched network of the target communications RAT may be a cell in a neighboring cell list, or may not be a cell in a neighboring cell list. In other words, in this application, after the terminal device is dropped from a network, cell search is not limited to the neighboring cell list, and may not be limited to searching for a cell in the neighboring cell list, or may search for a cell that is not in the neighboring cell list, provided that a high-RAT cell is found. For example, the terminal device may first search for a cell in the neighboring cell list, and if there is no high-RAT cell, then the terminal device searches for a cell that is not in the neighboring cell list.

For example, when the terminal device falls into a lower RAT (in a connected mode), the terminal device searches for prestored information about a cell. The cell is a cell of the target RAT. The terminal device further stores information about a neighboring cell, and the information about the neighboring cell is information about a neighboring cell configured by a network device for the second cell, that is, information about a neighboring cell in the neighboring cell list. A cell corresponding to the prestored information about a cell may be a cell found by the terminal device in a historical process.

In addition, in this embodiment of this application, after the terminal device falls into a lower RAT, the terminal device starts to perform network search at a specified time point (for example, an optimal network search time point obtained through self-learning). Optionally, the optimal network search time point may server as a start moment, and a historical network restoration time point may serve as an end moment. A plurality of same time intervals are divided, and the terminal device performs network search every time interval until the network of the target RAT is found.

In this embodiment of this application, after falling into a lower RAT, the terminal device searches for the network of the target communications RAT when the terminal device is connected to a low-RAT cell. That is, the terminal device searches for a target network when being connected to the low-RAT cell. For example, if the terminal device is handed over from the first cell to the second cell and falls into a lower RAT, the terminal device searches for the network of the target RAT when being connected to the second cell. Before searching for the network of the target RAT, the terminal device is not handed over from the second cell to another low-RAT cell, that is, the terminal device does not access another low-RAT cell before being restores to a high RAT. In this solution, a change of a communications RAT identifier on a GUI in a process in which the terminal device falls into a lower RAT is as follows: Assuming that the terminal device falls from 4G to 3G, the communications RAT identifier displayed on the GUI of the terminal device changes from 4G to 3G. Then, the terminal device searches for the network of the target RAT. Assuming that a 4G cell is found, the terminal device accesses the 4G cell, and 4G is displayed on a status bar on the GUI. Therefore, a display change of the communications RAT identifier on the GUI is from 4G to 3G and then to 4G Time for displaying 3G is relatively short, because the terminal device is not handed over to another 3G cell in a process of continuously displaying 3G.

Case 2: No network is used as an example.

In this embodiment of this application, after the terminal device is dropped from a network, the terminal device needs to perform network re-search. A network search manner during the network re-search is different from a solution that network search is performed after the terminal device is dropped from a network in the foregoing existing solution. In one aspect, in this application, after the terminal device is dropped from a network, a design of a time point for triggering network search is different from that in the foregoing existing network search solution. For example, the terminal device searches for a target network every preset time interval. In other words, in this application, after the terminal device is dropped from a network, the terminal device performs network search at a same time interval. However, in the existing network search solution, network search intervals of the terminal device are different, and the network search intervals gradually increase. In addition, the terminal device triggers search for the target network at an interval from the optimal network search time point, and the latest network search time point is a time point that is obtained by the terminal device through self-learning and at which the terminal device can access a high RAT as soon as possible.

In another aspect, in this application, the network re-search after the terminal device is dropped from a network means that the terminal device searches for only the network of the target RAT. This is different from that the network re-search after the terminal device is dropped from a network means that the terminal device searches for a network of any RAT in the existing solution. For a manner in which the terminal device searches for only the network of the target RAT, refer to the foregoing description.

In this embodiment of this application, a change of a communications RAT identifier on a GUI in a process in which the terminal device is dropped from a network is as follows: Assuming that the terminal device is dropped from a 4G network, the communications RAT identifier displayed on the GUI of the terminal device changes from 4G to no signal. Then, the terminal device searches for only the target network. When a 4G cell is found, the terminal device accesses the 4G cell. In this case, 4G is displayed on the GUI. In other words, after the terminal device is dropped from a network, the communications RAT identifier changes as follows: from 4G to no signal and then to 4G. That is, after the terminal device is dropped from a network, the terminal device does not access a low-RAT network. Instead, the terminal device is directly restored to a high-RAT network. This ensures that the terminal device can be restored to the high-RAT network as soon as possible.

Therefore, in this embodiment of this application, after a network anomaly occurs on the terminal device, the terminal device can be restored to the high-RAT network as soon as possible.

For example, searching for the network of the target communications RAT is started at a first time point, there is a first time interval between the first time point and a second time point, the second time point is a time point at which a network anomaly occurs, and the first time point is a time point after the second time point. The first time interval is greater than or equal to 5 s.

Optionally, after a network anomaly occurs on the terminal device, the terminal device searches for the target network based on the network search manner in this application, and records first duration required from a moment at which the network anomaly occurs to a moment at which the terminal device is connected to the target network. The terminal device may be controlled to use a default network search mode. For example, a network search manner switching button is displayed on an interface of an electronic device, and a user controls switching between specified network search and default network search by controlling the switching button. The default network search mode is, for example, the network search manner in the conventional technology described above. When the terminal device performs specified network search, the terminal device is connected to the network of the target communications RAT within first duration after the terminal device falls into a lower RAT or is dropped from a network. Subsequently, the terminal device may be controlled to be in the default network search mode. When a network anomaly occurs on the terminal device again at a same place, the terminal device is connected to the network of the target communications RAT within second duration. The second duration is greater than the first duration. In other words, in the network search manner in this application, the terminal device can be restored to the high-RAT network as soon as possible. The first duration is, for example, 5 s or 10 s, and the second duration is, for example, 15 s or 20 s. This is not limited in this embodiment of the present invention.

Optionally, when a network anomaly occurs on the terminal device, if it is determined that the terminal device is in a screen-on state, the terminal device searches for the target network. Usually, when the terminal device is in a screen-off state, it indicates that a user currently does not operate the terminal device, and the terminal device may not need to search for the target network, to reduce power consumption.

There is a possible case in which the terminal device fails to find the target network or finds the target network but fails to access the target network. In this case, the terminal device may access a low-RAT network (that is, a network whose communications RAT is lower than a communications RAT before no network or a fall into a lower RAT). For example, after starting to search for the target network, the terminal device waits for preset duration. The preset duration is, for example, 20 s or 30 s. When the terminal device does not search for or access the target network within the preset duration, the terminal device accesses the low-RAT network. Alternatively, after a quantity of times of searching for the target network reaches a preset quantity of times, the terminal device does not search for or access the target network, and the preset quantity of times is, for example, 3, 7, or 11.

For ease of description, that the terminal device searches for the target network may be briefly referred to as specified network search of the terminal device below.

The network search method according to this embodiment of this application may be applicable to a plurality of application scenarios, for example, including but not limited to the following scenarios.

Figure 3:
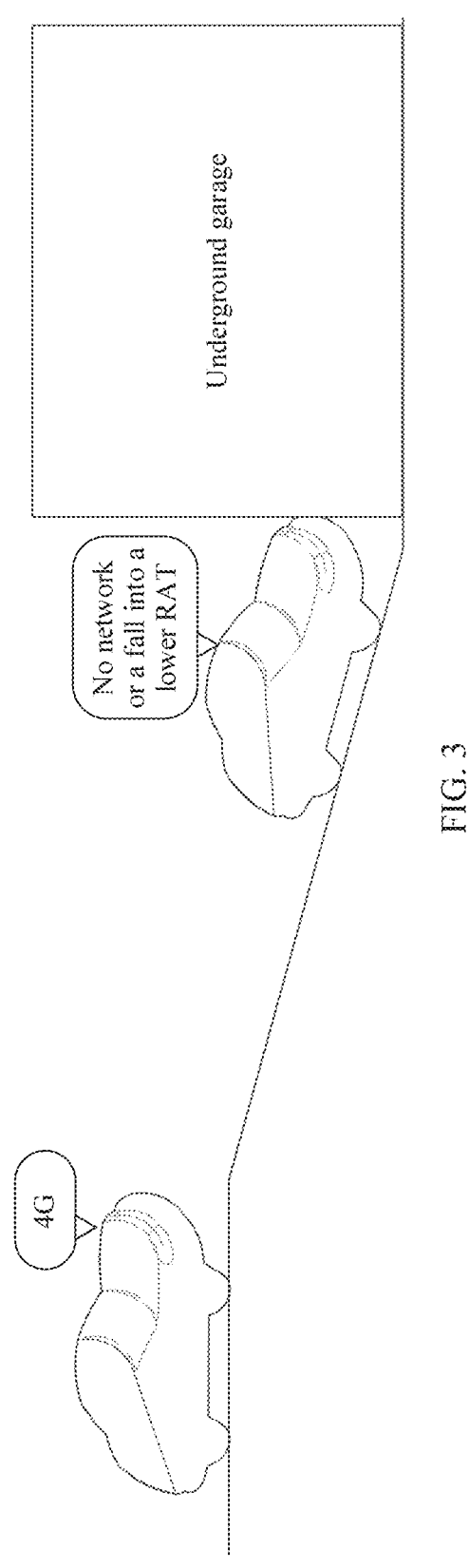
FIG. 3 is a schematic diagram of an application scenario according to an embodiment of this application.

A first scenario is an underground garage scenario. Refer to FIG. 3. When a terminal device (for example, a mobile phone) of a user enters the underground garage, a network anomaly occurs, for example, no network or a fall into a lower RAT occurs. Once no network or a fall into a lower RAT occurs, it may take a long time to restore to an original high RAT. Therefore, after the user drives out of the underground garage, it takes a relatively long time for the terminal device to restore to a high RAT. This affects user experience.

Figure 4:
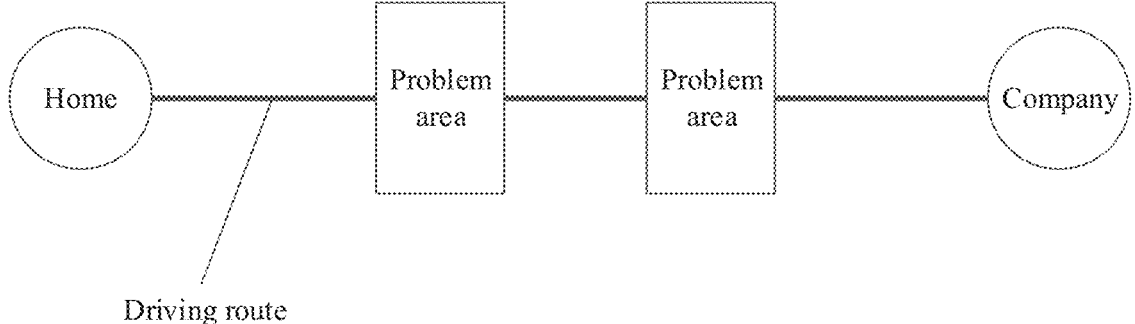
FIG. 4 is a schematic diagram of another application scenario according to an embodiment of this application.

A second scenario is a non-underground garage scenario, for example, a problem area on a driving route. Refer to FIG. 4. One or more problem areas exist on a driving route from home to a company. When the terminal device enters the problem area, a network anomaly (for example, no network or a fall into a lower RAT) occurs. When the terminal device moves out of the problem area, it may take a long time to restore to a high RAT. This affects user experience.

Embodiment 2: Fence

This embodiment describes fence-related content, including a fence form, fence collection, fence marking, fence use, and the like.

2.1. Fence Form

A fence may be implemented in a plurality of forms. The following provides several examples.

First Example of the Fence:

The fence includes a first cell identifier of a first cell and a second cell identifier of a second cell. The first cell is a cell accessed by a terminal device before the terminal device falls into a lower RAT, and the second cell is a cell accessed by the terminal device after the terminal device falls into a lower RAT. A form of the fence may be (a first cell identifier, a second cell identifier). For example, the terminal device accesses the first cell (a 4G cell), and then accesses the second cell (3G cell), that is, the terminal device falls into a lower RAT. The fence may be identified as (a cell identifier of the 4G cell, a cell identifier of the 3G cell). For example, refer to Table 1 that shows an example of a plurality of fences, cell ID is used as an example of a cell identifier.

TABLE 1

| Fence | Fence range |
|---|---|
| Fence 1 | (cell ID A, cell ID B) |
| Fence 2 | (cell ID B, cell ID C) |

The fence 1 in Table 1 is used as an example. The terminal device accesses the cell A before being dropped from a network, and an identifier of the cell A is cell ID A. The terminal device accesses the cell B after being dropped from a network, and an identifier of the cell B is cell ID B.

Second Example of the Fence:

The fence includes a first cell identifier of a serving cell and a second cell identifier of at least one neighboring cell. For example, a form of the fence may be (an identifier of a cell A, an identifier of a cell B). The cell A is the serving cell of the terminal device, and the cell B is the neighboring cell of the cell A. For example, refer to Table 2 that shows examples of a plurality of fences, cell ID is used as an example of a cell identifier.

TABLE 2

| Fence identifier | Fence range |
|---|---|
| Fence 1 | (cell ID A, cell ID B) |
| Fence 2 | (cell ID B, cell ID C) |

The fence 1 in Table 2 is used as an example. The serving cell of the terminal device is the cell A, an identifier of the cell A is cell ID A, the neighboring cell of the terminal device is the cell B, and an identifier of the cell B is cell ID B.

Third Example of the Fence:

The fence includes a first cell identifier of a serving cell, a first signal strength threshold of the serving cell, a second cell identifier of at least one neighboring cell, and a second signal strength threshold of the at least one neighboring cell. For example, a form of the fence may be (an identifier of a cell A, a signal strength threshold of the cell A, an identifier of a cell B, a signal strength threshold of the cell B). The cell A is the serving cell of the terminal device, and the cell B is the neighboring cell of the cell A. For example, refer to Table 3 that shows fence ranges corresponding to a plurality of fences, cell ID is used as an example of a cell identifier.

TABLE 3

| Fence identifier | Fence range |
|---|---|
| Fence 1 | (cell ID A, signal strength threshold of cell ID A, cell ID B, signal strength threshold of cell ID B) |
| Fence 2 | (cell ID B, signal strength threshold of cell ID B, cell ID C, signal strength threshold of cell ID C) |
| Fence 3 | (cell ID C, signal strength threshold of cell ID C, cell ID D, signal strength threshold of cell ID D) |

Compared with that in the first example and the second example, in the third example, the fence further includes the signal strength threshold of the serving cell and the signal strength threshold of the neighboring cell. Therefore, whether the terminal device enters the fence can be more accurately identified.

The fence 1 in Table 3 is used as an example. A manner in which the terminal device determines whether to enter the fence 1 is as follows: The terminal device detects the first cell identifier of the serving cell, for example, cell ID A, and further detects that the signal strength of the serving cell is X. The terminal device detects the second cell identifier such as cell ID B of the neighboring cell, and further detects that the signal strength of the neighboring cell is Y. To be specific, the terminal device obtains cell ID A, X, cell ID B, and Y, determines that cell ID A is consistent with cell ID A in the fence 1, cell ID B is consistent with cell ID B in the fence 1, X is greater than the signal strength threshold of cell ID A in the fence 1, and Y is greater than the signal strength threshold of cell ID B in the fence 1, and determines that the terminal device enters the fence 1.

In addition to the foregoing several examples, the fence may have another form. For example, the fence may further include a GPS or the like. This is not limited in this embodiment of this application.

2.2. Fence Obtaining (or Fence Collection)

Figure 5:
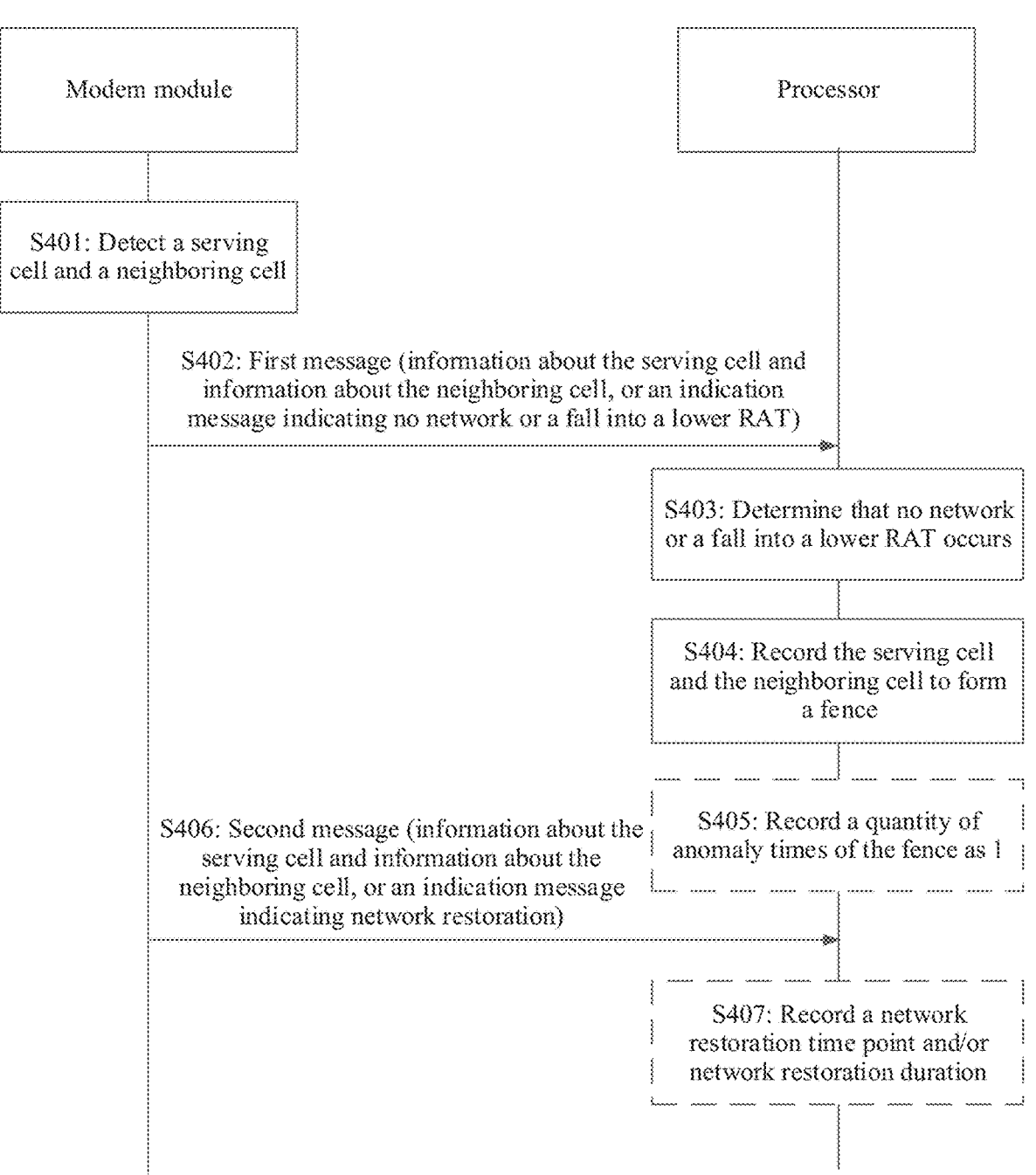
FIG. 5 is a schematic diagram of a fence collection process according to an embodiment of this application.

The foregoing second example of the fence (that is, the fence includes the first cell identifier of the serving cell and the second cell identifier of the neighboring cell) is used as an example. FIG. 5 is a schematic diagram of performing fence collection by a terminal device once. FIG. 5 may be understood as a schematic diagram of information exchange between a processor and a modem (modem) module in the terminal device. The processor may be an application processor (application processor, AP) or another processor.

S401: The modem module in the terminal device detects information about the serving cell and information about the neighboring cell.

The modem module is responsible for performing serving cell detection and neighboring cell detection. The neighboring cell detection includes detecting a cell identifier, a signal strength, a working frequency/frequency band, a communications RAT, and the like of the neighboring cell. The modem module can perform neighboring cell detection in real time or periodically.

S402: The modem module sends a first message to the processor.

In a first case, after the modem module detects the information about the neighboring cell, if a handover condition is met, cell handover may be performed. For example, the modem module is handed over from a first cell to a second cell, and a communications RAT of the second cell is lower than a communications RAT of the first cell. The modem module may notify the processor by using the first message. The first message may be indication information used to indicate that the terminal device is dropped from a network or falls into a lower RAT. For example, when the first message is 0, it indicates that the terminal device falls into a lower RAT. When the first message is 1, it indicates that the terminal device is dropped from a network. Alternatively, the first message is used to indicate that a network anomaly occurs. If the first message is 0, it indicates that the terminal device may be dropped from a network or falls into a lower RAT.

In a second case, the first message is the information about the serving cell and the information about the neighboring cell that are detected by the modem module. For example, when accessing a first cell, the modem module sends information about the first cell (for example, a cell identifier and a communications RAT) and information about a first neighboring cell to the processor. When the modem module is handed over to a second cell, the modem module sends information about the second cell and information about a second neighboring cell to the processor. The processor compares the communications RAT of the first cell with a communications RAT of the second cell, to determine whether the communications RAT falls into a lower RAT. Certainly, the first message may alternatively include only the information about the serving cell.

S403: The processor determines that no network or a fall into a lower RAT occurs.

For the foregoing first case, the processor may intuitively determine, based on the first message, whether no network or a fall into a lower RAT occurs.

For the foregoing second case, the processor compares the communications RAT of the first cell with the communications RAT of the second cell, to determine whether the communications RAT falls into a lower RAT.

S404: The processor records the information about the serving cell and the information about the neighboring cell to form a fence.

For the foregoing first case, the fence may include the information about the serving cell and the information about the neighboring cell before no network or a fall into a lower RAT occurs.

For the foregoing second case, the fence may include the information about the first cell and the information about the first neighboring cell.

S405: The processor records a quantity of anomaly times of the fence.

After recording the fence, the terminal device may record the quantity of anomaly times corresponding to the fence as 1.

S406: The processor receives a second message sent by the modem module.

The second message may be indication information used to indicate the terminal device to restore a network. For example, when the second message is 10, the second message is used to indicate network restoration. The network restoration means that the terminal device accesses a network whose communications RAT is higher than or equal to a communications RAT before no network or a fall into a lower RAT occurs.

Alternatively, the modem module accesses a third cell, and the second message is information about the third cell and information about a third neighboring cell. The processor compares a communications RAT of third first cell with the communications RAT of the second cell, to determine whether to perform network restoration.

S406 is optional, and is represented by a dashed line in the figure.

S407: The processor records a network restoration time point and/or network restoration duration.

The network restoration time point is a moment at which the terminal device restores the network. S407 is optional, and is represented by a dashed line in the figure. The network restoration duration may be, for example, duration from a moment of no network or a fall into a lower RAT to a network restoration time point.

FIG. 5 describes a process of performing fence collection once. The terminal device may obtain a plurality of fences through collection for a plurality of times, or may obtain a same fence through collection for a plurality of times. In this case, the quantity of anomaly times of the fence is updated (increased). For example, refer to Table 4 that shows examples of a plurality of fences collected by the terminal device.

TABLE 4

| Collected fence | Fence range | Quantity of anomaly times | Recorded restoration time point |
| --- | --- | --- | --- |
| Fence 1 | (cell ID A, cell ID B) | 5 | a |
| Fence 2 | (cell ID B, cell ID C) | 1 | b |
| Fence 3 | (cell ID C, cell ID D) | 2 | c |

2.3. Fence Scenario Identification

This part describes which fences are identified by the terminal device to be in the first scenario (namely, the underground garage scenario) and which fences are identified to be in the second scenario (namely, the non-underground garage scenario, for example, the problem area on the driving route). A fence scenario identification process may alternatively be understood as a fence scenario marking process.

Certainly, there is a possible case in which the terminal device only needs to identify which fences are in the underground garage scenario, and the remaining fences are in the non-underground garage scenario.

There are a plurality of fence scenario identification manners, for example, including but not limited to at least one of the following:

Manner 1: The terminal device stores a plurality of fences, and a scenario corresponding to each fence has been marked in advance, for example, is prestored in the terminal device before delivery. For example, refer to Table 5.

TABLE 5

| Fence | | Scenario |
| --- | --- | --- |
| Fence 1 | Underground garage 1 | Underground |
| Fence 2 | Underground garage 2 | garage scenario |
| Fence 3 | Problem area 1 on the driving route | Non-underground |
| Fence 4 | Problem area 2 on the driving route | garage scenario |

A process in which the terminal device prestores a plurality of fences and a scenario mark of each fence includes: using an underground garage as an example, a tester carries the terminal device into the underground garage, the terminal device detects fences, and the tester reads the fences detected by the terminal device and manually marks a scenario corresponding to each fence. For example, if it is manually determined that a fence corresponds to the underground garage scenario, the fence is marked to be in the underground garage scenario, and then a marking result of each fence is written into the terminal device. Therefore, before delivery, the terminal device stores the plurality of fences and the scenario mark corresponding to each fence.

Manner 2: A scenario corresponding to each fence may be marked by a user. For example, the terminal device provides an app or an interface used to mark a fence, and the terminal device displays a detected fence in the app or the interface. The app or the interface may further provide an input box used to enter a scenario mark of the fence. For example, the user drives into an underground garage in a residential community. The terminal device detects a fence, and displays the fence in the app or the interface. The user may enter a mark "home garage" in the input box. After detecting an input operation performed by the user in the input box, the terminal device establishes a correspondence between the fence and a garage scenario.

Manner 3: A scenario corresponding to each fence is determined by the terminal device based on motion data. Assuming that the terminal device detects that the terminal device enters a first fence, and determines, based on the motion data, that the terminal device is in the underground garage scenario, the terminal device determines that a scenario of the first fence is the underground garage scenario. For a process in which the terminal device determines, based on the motion data, that the terminal device is in the underground garage scenario, refer to Manner 2 in 3.1 in Embodiment 3 below.

Further, when a quantity of anomaly times corresponding to a fence is greater than a preset quantity of times, the fence is identified to be in the underground garage scenario; otherwise, the fence is identified to be in the non-underground garage scenario.

Manner 4: Manner 4 is similar to Manner 3. After entering a first fence, the terminal device collects motion data, and determines, based on the motion data, whether the terminal device exits; if yes, the fence is identified to be in the underground garage scenario; otherwise, the fence is identified to be in the non-underground garage scenario. For a process in which the terminal Device Determines, Based on the Motion Data, Whether the Terminal Device Exits, Refer to descriptions in 3.2.2 in Embodiment 3 below.

2.4. Fence Use

A fence is used to perform scenario detection. To be specific, a terminal device determines, through fence detection, whether the terminal device is currently in an underground garage scenario or a non-underground garage scenario. The terminal device may further determine, by using the fence, a target cell to which the terminal device is subsequently connected.

The foregoing fence marking part describes that fences are marked to be in different scenarios. Therefore, when detecting that the terminal device enters a fence, the terminal device may determine, by using a scenario mark of the fence, whether a scenario corresponding to the fence is an underground garage scenario or a non-underground garage scenario.

Embodiment 3: Underground Garage Scenario

In this embodiment, a network search method of a terminal device in an underground garage scenario is described, and may specifically include entry detection, exit detection, exit network search, and the like.

3.1. Identification of an Underground Garage Scenario

Manner 1: The terminal device detects that the terminal device enters a fence, and determines, based on the fence, whether the terminal device is in the underground garage scenario. For details, refer to the descriptions in 2.3 in Embodiment 2.

Manner 2: Considering that an entrance of an underground garage is usually set as a ramp, a vehicle entry process is a downhill process from a flat ground. In this process, motion data collected by a motion sensor in the terminal device changes. Therefore, it may be determined, by using the motion data, that the terminal device is in the underground garage scenario. The motion sensor includes an accelerometer, a gyroscope, and the like.

For example, the motion data is an attitude angle. The terminal device stores a preset attitude angle. The preset attitude angle may be a default fixed value, or may be an attitude angle collected by the terminal device on an exit ramp in advance. When a difference between the attitude angle collected by the terminal device and the preset attitude angle is less than a threshold, the terminal device determines that the terminal device enters the underground garage.

Alternatively, the terminal device collects a curve of the attitude angle changing with time, and if the curve is consistent with a preset curve, the terminal device determines to enter the underground garage. The preset curve may be a default fixed curve, or a curve of the attitude angle changing with time that is collected by the terminal device in an entry process in advance.

In some embodiments, the identification of the underground garage scenario may be implemented by using a first algorithm model.

In an example, an input parameter of the first algorithm model includes a motion data stream collected by the motion sensor, an output parameter includes indication information, and the indication information is used to indicate entry or non-entry. For example, if the indication information is X, entry is determined, that is, an underground garage scenario is entered; and if the indication information is Y, non-entry is determined, that is, a non-underground garage scenario occurs. For example, the first algorithm module may compare the collected attitude angle with the preset attitude angle, or compare the collected curve of the attitude angle changing with time with the preset curve.

Alternatively, an input parameter of the first algorithm model includes a motion data stream, and an output parameter includes a motion curve. In this manner, the first algorithm model compares the input parameter with a plurality of preset curves (curves corresponding to a plurality of underground garage scenarios), to find a preset curve that matches the input parameter, and then outputs the preset curve. When the preset curve is output, it is determined that the terminal device is in the underground garage scenario.

In some embodiments, the input parameter of the first algorithm model may be original motion data collected by the motion sensor, or may be data obtained after the original motion data is preprocessed. The preprocessing may include performing coordinate conversion on the original motion data, and converting the original motion data from a sensor coordinate system to a body coordinate system of the terminal device. For example, coordinate conversion is performed in the following manner:

$$B = \begin{bmatrix} \cos\theta\cos\gamma & \cos\theta\sin\gamma & -\sin\theta \\ -\cos\varphi\sin\gamma + \sin\varphi\sin\theta\cos\gamma & \cos\varphi\cos\gamma + \sin\varphi\sin\theta\sin\gamma & \sin\varphi\cos\theta \\ \sin\theta\sin\gamma + \cos\varphi\sin\theta\cos\gamma & -\sin\varphi\cos\gamma + \cos\varphi\sin\theta\sin\gamma & \cos\varphi\cos\theta \end{bmatrix} N$$

N indicates the original motion data, and B indicates motion data obtained after coordinate conversion is performed on the original motion data. An intermediate matrix is a transformation matrix, and may be preset.

The first algorithm model may be a decision tree, logistic regression (logistic regression, LR), a naive Bayes (naive Bayes, NB) classification algorithm, a random forest (random forest, RF) algorithm, a support vector machine (support vector machine, SVM) algorithm, a histogram of oriented gradients (histogram of oriented gradients, HOG), a neural network, a deep neural network, a convolutional neural network, or the like. The first algorithm model may be a model that is established in advance and stored in the terminal device before delivery; or an initial model is stored before delivery, and the first algorithm model is a model obtained after the initial model is trained. A training process may be understood as inputting an input parameter (motion data) to the initial model, and performing an operation to obtain an output result (underground garage scenario or non-underground garage scenario). If the output result is inconsistent with a real result, the initial model is adjusted, so that an output result obtained by the adjusted model is connected to the real result as much as possible, and a model obtained after a model parameter is adjusted is the first algorithm model.

3.2 Exit Detection

In this embodiment of this application, the terminal device performs exit detection by using an exit parameter. This embodiment describes related content of the exit parameter, including content of the exit parameter, obtaining of the exit parameter, self-learning of the exit parameter, a function of the exit parameter, and the like.

3.2.1 Content of an Exit Parameter

For the first scenario, namely, the underground garage scenario, the terminal device may perform exit detection by using the exit parameter, that is, determine, by using the exit parameter, whether the terminal device exits. That the terminal device performs exit detection by using the exit parameter may be understood as follows: The terminal device detects a current exit parameter, compares the current exit parameter with a historical exit parameter, and if the current exit parameter is consistent with the historical exit parameter, determines that the terminal device exits; otherwise, determines that the terminal device does not exit. Content included in the current exit parameter and the historical exit parameter may be the same or similar, but detection time points are different. The historical exit parameter may be understood as an exit parameter that is historically collected by the terminal device and that can indicate exit, and is used as a reference for the terminal device to detect whether exit is currently performed.

Generally, an exit of an underground garage is designed as a ramp, and a vehicle needs to climb the ramp when a user drives the vehicle to exit. In a vehicle climbing process, motion data collected by a motion sensor (an accelerometer, a gyroscope, or the like) in the terminal device (the terminal device is placed in the vehicle) changes. Therefore, exit detection may be performed by using the motion data.

Therefore, the exit parameter (a current exit parameter or a historical exit parameter) may include at least one of the following.

1. Motion data and/or motion data stream, where the motion data stream may be understood as a motion data stream collected by the motion sensor in the terminal device in real time, or may be referred to as a curve of motion data changing with time; for example, in a real exit scenario, the terminal device detects motion data in real time, to obtain a curve of the motion data changing with time, and the curve is a standard curve corresponding to exit; and during actual application, the terminal device detects motion data in real time, to obtain a first curve of the motion data changing with time; the terminal device determines whether the first curve matches the standard curve; if the first curve matches the standard curve, it is determined that the terminal device exits; otherwise, it is determined that the terminal device does not exit.

Considering that different underground garage exits have different designs, for example, exit ramps of some underground garages are steep, and ramps of some underground garages are flat, each underground garage corresponds to a standard curve, and the standard curve is used to detect whether the terminal device moves out of an underground garage corresponding to the standard curve. As described above, each underground garage corresponds to a fence. Therefore, there is a correspondence between the fence and the standard curve. Table 5 is used as an example. Assuming that the terminal device detects that the terminal device enters the fence 1 and determines that the terminal device is located in the underground garage 1, the terminal device may detect, based on a standard curve corresponding to the fence 1, whether the terminal device moves out of the underground garage 1.

The following first describes the standard curve.

Figures 6A, 6B:
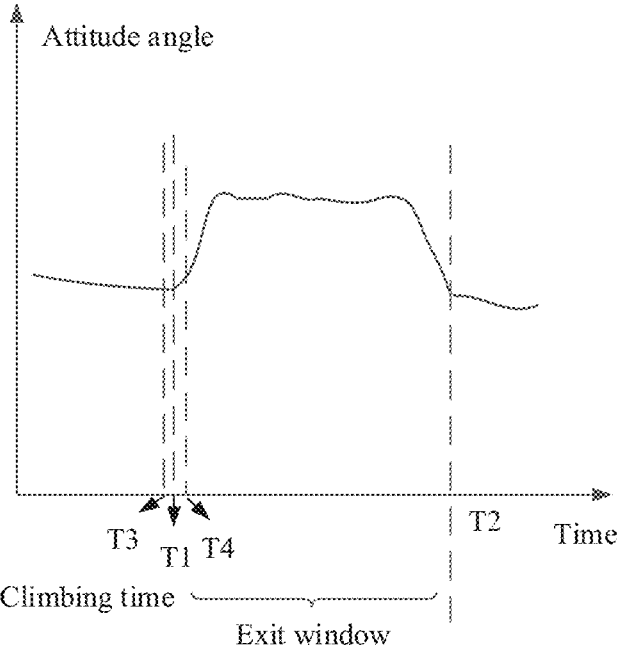
FIG. 6A is a schematic diagram of an exit curve according to an embodiment of this application.
FIG. 6B is a schematic diagram of an algorithm model according to an embodiment of this application.

For example, the motion data includes an attitude angle of the terminal device. The attitude angle means that the terminal device has a right-hand coordinate system that is formed in rightward, forward, and upward directions, and the attitude angle is a rotation angle rotating around a right axis. Therefore, the standard curve is a curve of the attitude angle changing with time. For example, refer to FIG. 6A. FIG. 6A is an example of a standard curve.

The terminal device obtains the standard curve in a plurality of manners.

For example, the standard curve is prestored in the terminal device, and a corresponding standard curve is stored for different underground garages, or a corresponding standard curve is stored for different fences.

Alternatively, the standard curve is drawn by the terminal device based on an attitude angle collected in real time. It should be noted herein that there is a possible case in which motion data collected by the terminal device is raw data, and the raw data needs to be converted into an attitude angle through processing. In this case, after collecting the original data, the terminal device processes the original data to obtain the attitude angle, and then draws a curve of the attitude angle changing with time. A process of converting the original data into the attitude angle is not described in this embodiment of this application.

2. Climbing (or Ramp-Up) Start Time Point

The climbing start time point is a time point at which climbing is started from a flat ground (a flat ground in the underground garage). For example, the climbing start time point may be a first preset moment after a moment at which the terminal device detects that the terminal device enters a fence, or a second preset moment after a moment at which no network/a fall into a lower RAT is detected. Usually, for example, duration in which a user carries a terminal device from home to an underground garage and then drives out of the underground garage is relatively fixed. Therefore, after the terminal device enters a fence or is dropped from a network/falls into a lower RAT, the terminal device drives out of the underground garage within preset duration. Therefore, a climbing time point can be used as an exit parameter to check whether exit is performed. Alternatively, the climbing start time point is a time point at which a slope increases on a curve of motion data changing with time collected by the terminal device. Alternatively, if there is the historical exit parameter, the terminal device may further determine, after detecting that the terminal device enters a fence in an underground garage scenario, that a time point at which a slope increases on an exit curve corresponding to the fence is a historical climbing start time point. For example, refer to FIG. 6A, and the climbing time point may be T1 on a curve in the figure.

3. Climbing Stop Time Point

The climbing stop time point is time from an exit ramp to a flat ground outside the underground garage. For example, the climbing stop time point may be a third preset moment after a moment at which the terminal device detects that the terminal device enters a fence, where the third preset moment is after the first preset moment. Alternatively, the climbing stop time point may be a fourth preset moment after a moment at which no network/a fall into a lower RAT is detected, and the fourth preset moment is after the second preset moment. Alternatively, the climbing stop time point is a time point at which a slope decreases on a curve of motion data changing with time collected by the terminal device. Alternatively, if there is the historical exit parameter, after the terminal device detects that the terminal device enters a fence in an underground garage scenario, the terminal device may determine that a time point at which a slope decreases on an exit curve corresponding to the fence is a historical climbing stop time point. For example, refer to FIG. 6A, and the climbing stop time point may be T2 on a curve in the figure.

4. Motion Data (for Example, an Attitude Angle) Corresponding to a Climbing Start Time Point and/or a Change Value of Motion Data Corresponding to a Climbing Start Time Point The motion data corresponding to a climbing start time point is a vertical coordinate corresponding to T1 in FIG. 6A. The change value of motion data corresponding to a climbing start time point is a difference or an absolute value of a difference between a vertical coordinate of T3 before T1 and a vertical coordinate of T4 after T1 in FIG. 6A. Usually, when a vehicle starts to climb a ramp (from a flat ground to a ramp with a slope), motion data changes significantly. For example, refer to FIG. 6A. A change of a slope (namely, a change of an attitude angle) corresponding to the climbing time point T1 is great, which may reflect that the terminal device starts to climb, and may be used to detect whether the terminal device exits.

5. Motion Data (for Example, an Attitude Angle) Corresponding to a Climbing Stop Time Point and/or a Change Value of Motion Data Corresponding to a Climbing Stop Time Point The motion data corresponding to a climbing stop time point is a vertical coordinate corresponding to T2 in FIG. 6A. The change value of motion data corresponding to a climbing stop time point is a difference or an absolute value of a difference between a vertical coordinate at a moment before T2 and a vertical coordinate at a moment after T2 in FIG. 6A. Usually, when a vehicle stops climbing a ramp (from a ramp with a slope to a flat ground), motion data also changes significantly. For example, refer to FIG. 6A. A change of a slope (namely, a change of an attitude angle) corresponding to the climbing stop time point T2 is great, which may reflect that the terminal device stops climbing, and may be used to detect whether the terminal device exits.

6. Exit window, namely, a time difference between a climbing start time point and a climbing stop time point, which may be referred to as climbing duration. FIG. 6A is used as an example. An exit window is a time difference between T2 and T1.

7. Cell Identifier Information

The cell identifier information includes cell identifiers of one or more cells detected in a process in which the terminal device historically leaves the underground garage scenario. For example, the terminal device records a first cell identifier of a first cell accessed (and/or found) within a first preset time period before exit, and records a second cell identifier of at least one second cell found within a second preset time period after exit. In this case, the terminal device stores the cell identifier information as (the first cell identifier, the second cell identifier). The first preset time period and the second preset time period are the same or different, for example, both are 2 s.

8. Signal Strength Information and/or Signal Strength Change Information

The signal strength information includes cell signal strengths of one or more cells detected in a process in which the terminal device historically leaves the underground garage scenario. For example, the terminal device records a first signal strength of a first cell accessed (and/or found) within a first preset time period before exit, and records a second signal strength of the first cell found within a second preset time period after exit. That is, both the first signal strength and the second signal strength are signal strengths of the first cell. In this case, the terminal device stores the signal strength information as (the first signal strength, the second signal strength).

The signal strength change information includes a change value between a first signal strength and a second signal strength. The first signal strength is a signal strength that is of a first cell and that is detected within a first preset time period before the terminal device historically leaves the underground garage scenario, and the second signal strength is a signal strength that is of the first cell and that is detected within a second preset time period after the terminal device historically leaves the underground garage scenario. For example, the terminal device records a first signal strength of the first cell accessed (and/or found) within the first preset time period before exit, records a second signal strength of the first cell that is found within the second preset time period after exit, and determines and records the signal strength change information of the first signal strength and the second signal strength.

3.2.2 Function of an Exit Parameter

Case 1: The exit parameter is used to check whether the terminal device exits.

In a manner, the terminal device detects a current exit parameter, and compares the current exit parameter with a historical exit parameter. If the current exit parameter is consistent with the historical exit parameter, it is determined that the terminal device exits; otherwise, it is determined that the terminal device does not exit. Content included in the current exit parameter and the historical exit parameter may be the same, but detection time points are different. The current exit parameter may be an exit parameter recently collected by the terminal device.

The foregoing first exit parameter is used as an example. The first exit parameter includes motion data such as an attitude angle. A process in which the terminal device performs exit detection by using the exit parameter may include: if the terminal device currently detects a first attitude angle, and determines that a difference between the first attitude angle and an attitude angle in a historical exit parameter is less than a threshold, the terminal device determines that the terminal device exits. It is assumed that the first exit parameter includes the standard curve. A process in which the terminal device performs exit detection by using the exit parameter may include: The terminal device collects a first curve of a current attitude angle changing with time, determines whether the first curve matches a standard curve in the historical exit parameter, and if the first curve matches the standard curve in the historical exit parameter, determines that the terminal device does not exit. There are a plurality of manners in which the terminal device determines whether the first curve matches the standard curve. For example, whether a shape of the first curve is the same as that of the standard curve is determined, for example, if the first curve is a straight line, and the standard curve is a curve shown in FIG. 6A, it is determined that the terminal device does not exit. For another example, if a value of an attitude angle on the first curve is the same as a value of an attitude angle on the standard curve, it is determined that the terminal device exits.

The foregoing second exit parameter is used as an example. The second exit parameter includes a climbing start time point. A process in which the terminal device performs exit detection by using the exit parameter may include: If the terminal device currently detects a first climbing start time point, and determines that a difference between the first climbing start time point and a climbing start time point in a historical exit parameter is within a threshold, the terminal device determines that the terminal device exits. The first climbing start time point may be a time point after preset duration starting from a moment at which no network or a fall into a lower RAT is detected or starting from a moment of detecting that the terminal device enters a fence in an underground garage. Alternatively, the terminal device detects a first curve of an attitude angle changing with time, and the first climbing start time point is a time point at which a slope increases on an exit curve. In this manner, an exit time point may be a time point recorded when exit is detected by using the exit parameter, or may be preset duration after a time point recorded when exit is detected by using the exit parameter. The preset duration is, for example, duration corresponding to an exit window.

The foregoing third exit parameter is used as an example. The third exit parameter includes a climbing stop time point. A process in which the terminal device performs exit detection by using the exit parameter may include: If the terminal device currently detects a first climbing stop time point, and determines that a difference between the first climbing stop time point and a climbing stop time point in a historical exit parameter is within a threshold, the terminal device determines that the terminal device exits. The first climbing stop time point may be a time point after preset duration starting from a moment at which no network or a fall into a lower RAT is detected or starting from a moment of detecting that the terminal device enters a fence in an underground garage. Alternatively, the terminal device detects an exit curve, and the first climbing stop time point is a time point at which a slope decreases on the exit curve.

The foregoing fourth exit parameter is used as an example. Assuming that the fourth exit parameter includes motion data corresponding to a climbing start time point, a process in which the terminal device performs exit detection by using the exit parameter may include: If the terminal device detects a first climbing start time point, and determines that an attitude angle corresponding to the first climbing start time point is a first attitude angle, the terminal device compares the first attitude angle with a second attitude angle; and if a difference is less than a threshold, the terminal device determines that the terminal device exits. The second attitude angle is an attitude angle corresponding to a climbing start time point in a historical exit parameter. Assuming that the fourth exit parameter includes a change value of motion data corresponding to a climbing start time point, a process in which the terminal device performs exit detection by using the exit parameter may include: if the terminal device detects a first climbing start time point, and determines that a change value of an attitude angle corresponding to the first climbing start time point is the same as a change value of an attitude angle corresponding to a climbing start time point in a historical exit parameter or a difference between them is less than a threshold, the terminal device determines that the terminal device exits. For a manner of determining the attitude angle corresponding to the first climbing start time point or the change value of the attitude angle corresponding to the first climbing start time point, refer to the foregoing descriptions. In this manner, an exit time point may be a time point recorded when exit is detected by using the exit parameter, or may be preset duration after a time point recorded when exit is detected by using the exit parameter. The preset duration is, for example, duration corresponding to an exit window.

The foregoing fifth exit parameter is used as an example. Assuming that the fifth exit parameter includes motion data corresponding to a climbing stop time point, a process in which the terminal device performs exit detection by using the exit parameter may include: if the terminal device detects a first climbing stop time point, and determines that an attitude angle corresponding to the first climbing stop time point is a first attitude angle, the terminal device compares the first attitude angle with a second attitude angle; and if a difference is less than a threshold, the terminal device determines that the terminal device exits. The second attitude angle is an attitude angle corresponding to a climbing stop time point in a historical exit parameter. Assuming that the fifth exit parameter includes a change value of motion data corresponding to a climbing stop time point, a process in which the terminal device performs exit detection by using the exit parameter may include: If the terminal device detects a first climbing stop time point, and determines that a change value of an attitude angle corresponding to the first climbing stop time point is the same as a change value of an attitude angle corresponding to a climbing stop time point in a historical exit parameter or a difference between them is less than a threshold, the terminal device determines that the terminal device exits. For a manner of determining the attitude angle corresponding to the first climbing stop time point or the change value of the attitude angle corresponding to the first climbing stop time point, refer to the foregoing descriptions.

The foregoing sixth exit parameter is used as an example. The sixth exit parameter includes climbing duration (namely, an exit window). A process in which the terminal device performs exit detection by using the exit parameter may include: if the terminal device detects first climbing duration, and determines that a difference between the first climbing duration and climbing duration in a historical exit parameter is less than a threshold, the terminal device determines that the terminal device exits.

The foregoing seventh exit parameter is used as an example. The seventh exit parameter includes cell identifier information. A process in which the terminal device performs exit detection by using the exit parameter may include: The terminal device detects a cell in real time. It is assumed that it is detected that current cell identifier information is (a first cell identifier, a second cell identifier). For example, the first cell identifier is an identifier of a current serving cell, and the second cell identifier is an identifier of a neighboring cell. If the terminal device determines that the current cell identifier information is consistent with cell identifier information in a historical exit parameter, the terminal device determines that the terminal device exits.

The foregoing eighth exit parameter is used as an example. Assuming that the eighth exit parameter includes signal strength information, a process in which the terminal device performs exit detection by using the exit parameter may include: The terminal device detects signal quality measurement of a cell in real time. It is assumed that it is detected that a current signal strength includes a third signal strength and a fourth signal strength, the third signal strength is a current signal strength of a serving cell, and the fourth signal strength is a current signal strength of a neighboring cell. If the terminal device determines that the current cell identifier information is consistent with cell identifier information in a historical exit parameter, the terminal device determines that the terminal device exits. Assuming that the eighth exit parameter includes a signal strength information change value, a process in which the terminal device performs exit detection by using the exit parameter may include: The terminal device detects signal quality measurement of a cell in real time. It is assumed that it is detected that a signal strength change value of a cell is a first signal strength change value. If the first signal strength change value is consistent with a signal strength change value of the cell in a historical exit parameter, the terminal device determines that the terminal device exits.

In this embodiment of this application, exit detection of the terminal device may be implemented by using a second algorithm model. For example, refer to FIG. 6B. The second algorithm model may perform operation on an input parameter by using an exit parameter to obtain an output parameter. The input parameter includes a curve (for example, the first curve) of motion data (for example, an attitude angle) that changes with time and that is collected by the terminal device, and the like. The output parameter is exit or non-exit.

The second algorithm model may be a neural network, a deep neural network, a convolutional neural network, or the like. This is not limited in this embodiment of this application. The second algorithm model may be a model that is established in advance and stored in the terminal device before delivery; or an initial model is stored before delivery, and the first algorithm model is a model obtained after the initial model is trained. The training process may include a self-learning process of the exit parameter below, namely, 3.2.4 in this embodiment. The trained model may be used to perform exit detection.

For Case 1, the terminal device performs exit detection by using the exit parameter. When exit is detected, the terminal device records an exit time point. The exit time point is an exit time point below.

Case 2: The exit parameter is used to detect an exit point.

In a first solution, it is assumed that the terminal device collects exit parameters on site to obtain a curve (a curve of an attitude angle changing with time). A specific manner of determining whether the curve is an exit curve based on a historical exit parameter is as follows: It is assumed that the historical exit parameter includes (i=1 s, j=5 s, and k=45 degrees), a rise start time is represented by i, an exit window is represented by j, and an attitude angle is represented by k. When the terminal device determines that, on the curve collected on site, the rise start time is i0=1.3 s, an exit window is j0=7 s, and an attitude angle is k0=46 degrees, where i0 is greater than 1 s, j0 is greater than 4 s, and k0 is greater than 45 degrees, the terminal device determines a climbing stop time point (for example, T2 in FIG. 6A) on the curve as the exit point. The historical exit parameter may be an exit parameter obtained by the terminal device through self-learning. For a self-learning process, refer to the following description.

In this case, the exit parameter is used to determine whether the curve collected by the terminal device on site is the exit curve. Because motion data is collected in real time in a moving process of a vehicle, a curve formed by motion data collected in a period of time may not be the exit curve. If an exit point is determined by using the curve, the detected exit point is inaccurate. Therefore, the terminal device determines, by using an exit parameter recorded historically, whether the curve collected by the terminal device on site is the exit curve, and determines the exit point based on the exit curve. This improves accuracy of exit point detection.

In a second solution, when determining that the terminal device is in an underground garage scenario, the terminal device determines an exit point by using a historical exit parameter (a historical exit curve). In this solution, the terminal device may not need to collect a curve on site. A manner of determining the exit point by using the historical curve is as follows: The terminal device detects that the terminal device enters a fence 1 (a fence in the underground garage scenario), searches for a historical exit curve corresponding to the fence 1, and determines the exit point, namely, T2, based on the historical exit curve. The historical exit curve is a curve corresponding to an exit parameter obtained by the terminal device through self-learning.

In a third solution, the exit parameter includes historical cell information. The terminal device may detect an exit time point based on currently collected cell information and historical cell information. The historical cell information includes cell information collected w % ben the terminal device historically moves out of the underground garage.

For example, a specific underground garage scenario is used as an example. When the terminal device historically leaves the underground garage scenario, historical cell information is collected, and a collection time point of the historical cell information is recorded. When the cell information currently collected by the terminal device is consistent with the historical cell information, the terminal device determines that the collection time point of the historical cell information is the exit time point, or determines that a time point at which the terminal device collects the current cell information is the exit time point.

It should be noted that in the foregoing first solution, the terminal device may continue to optimize the exit parameter by using the curve collected on site and the historical exit parameter. This part is described in a subsequent self-learning process of the exit parameter.

3.2.3 Obtaining (or Collection) of an Exit Parameter

As described above, the exit parameter includes a historical exit parameter and a current exit parameter. The historical exit parameter may be an exit parameter that has been collected by the terminal device and stored in the terminal device. For example, before delivery, a tester collects an exit parameter by using the terminal device, and stores the exit parameter in the terminal device; or after delivery, the terminal device collects and stores an exit parameter in a historical process in which a user (not a tester but a consumer who purchases the terminal device) uses the terminal device.

It is considered that exit parameters are different (for example, standard curves are different) for each garage, for example, the terminal device may store a plurality of fences, a scenario identifier corresponding to each fence, and an exit parameter corresponding to each fence marked as an underground garage scenario. For example, refer to Table 6:

TABLE 6

| Fence | | Exit parameter | Scenario |
|---|---|---|---|
| Fence 1 | Underground garage 1 | Exit parameter 1 | Underground |
| Fence 2 | Underground garage 2 | Exit parameter 2 | garage scenario |
| Fence 3 | Problem area 1 on a driving route | | Non-underground garage scenario |
| Fence 4 | Problem area 2 on the driving route | | |

When detecting that the terminal device enters a fence, the terminal device may perform exit detection based on an exit parameter corresponding to the fence. For example, if the terminal device detects that the terminal device enters the fence 1, it indicates that the terminal device enters the garage 1. In this case, the terminal device performs exit detection by using the exit parameter 1. For a process in which the terminal device performs exit detection by using the exit parameter, refer to the foregoing description in 3.2.2.

Figure 7:
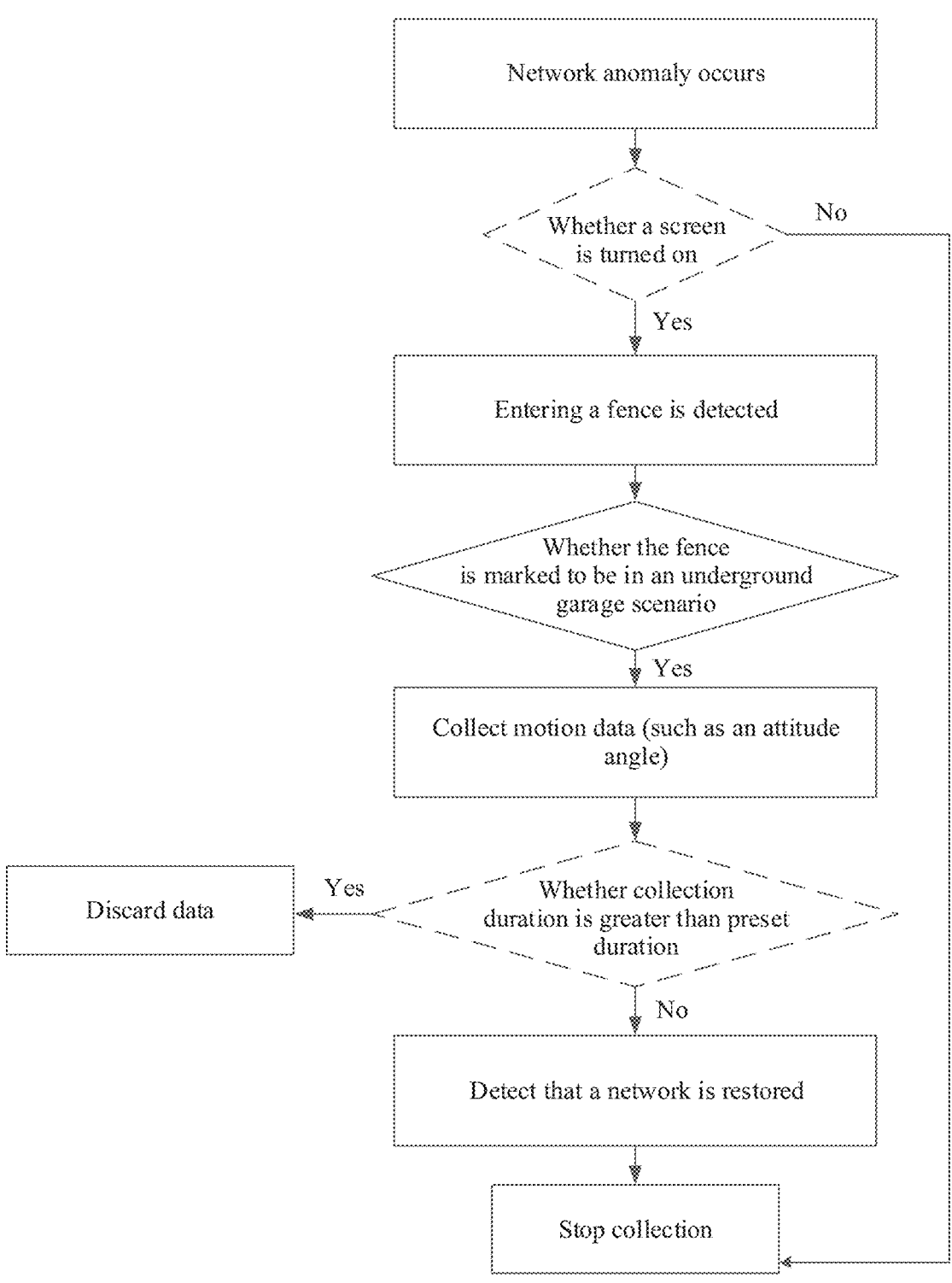
FIG. 7 is a schematic diagram of collecting an exit parameter according to an embodiment of this application.

The first exit parameter, namely, the curve of the attitude angle changing with time, is used as an example. FIG. 7 shows a process of collecting an attitude angle by a terminal device. When a network anomaly occurs on the terminal device, it is determined, based on a fence in which the terminal device is located, that the terminal device is in an underground garage scenario (3.1 in this embodiment), and motion data (for example, an attitude angle) is collected in real time. Optionally, when the terminal device is in a screen-on state, it usually indicates that a user is using the terminal device. Therefore, before detecting that the terminal device enters the fence, the terminal device may determine whether a screen is turned on. If the screen is turned on, fence detection is performed. If the screen is not turned on, fence detection does not need to be performed. Alternatively, before collecting the attitude angle, the terminal device determines whether a screen is on. If the screen is turned on, the terminal device collects the attitude angle. If the screen is not turned on, the terminal device does not collect the attitude angle. When detecting that the network is restored, the terminal device stops collecting the motion data. The terminal device may input the collected motion data into an algorithm model (for example, the second algorithm model) in real time for exit detection. In addition, the terminal device may search for the target network based on the collected data (for example, a moment of no network or a fall into a lower RAT, or a moment at which the terminal device enters a fence).

It is considered that a possible scenario is that the terminal device may be in a static state, and the static state herein may be understood as that the terminal device stays in a garage for a long time and does not exit. In this case, the terminal device still continuously collects motion data. However, the motion data cannot be used for exit detection. Therefore, after starting to collect the motion data, the terminal device may detect collection duration. If the collection duration reaches preset duration (for example, 15 minutes) but network restoration is still not detected, it indicates that the terminal device stays in the garage. In this case, the terminal device may discard collected data, for example, discard data collected within 15 minutes. If network restoration is detected when the collection duration is less than the preset duration, data collection is stopped, and collected data is stored.

3.2.4 Self-Learning of an Exit Parameter

The exit parameter includes a historical exit parameter and a current exit parameter. The historical exit parameter is used as a reference for the terminal device to detect whether the terminal device exits. Therefore, a relatively accurate historical exit parameter is expected to be obtained, to improve accuracy of exit detection. Therefore, the terminal device may obtain an ideal historical exit parameter in a self-learning manner. The following describes a self-learning process of the exit parameter by using an example in which the exit parameter includes an attitude angle, a climbing time point, and an exit window (for ease of description, in this specification, the climbing time point in the exit parameter is represented by i, the exit window is represented by j, and the attitude angle is represented by k).

A first exit parameter self-learning method is: Each time the terminal device collects an exit parameter, the terminal device verifies the exit parameter. The verification on the exit parameter may be understood as verifying whether the exit parameter is an ideal exit parameter. It is assumed that the terminal device collects exit parameters i, j, and k. The terminal device identifies the exit parameter to obtain an exit point, and records a network restoration point. The network restoration point is a time point at which the terminal device successfully accesses a high-RAT network. Assuming that a time difference between the exit point and the network restoration point is greater than a threshold, it is determined that the exit parameter is not ideal, and the exit parameter needs to be recollected, and the recollected exit parameter needs to be verified (a verification principle may be the same).

A second exit parameter self-learning method is as follows: Each time after the terminal device collects an exit parameter, the terminal device compares the exit parameter with an exit parameter collected last time, to determine a most ideal exit parameter. It is assumed that the terminal device collects a first exit parameter last time, and collects a second exit parameter next time. The terminal device identifies the first exit parameter to obtain a first exit point, records a first network restoration point (for example, by using the first algorithm model shown in FIG. 6B), and determines a first time difference between the first network restoration time point and the first exit point. The terminal device identifies the second exit parameter to obtain a second exit point, records a second network restoration point (for example, by using the first algorithm model shown in FIG. 6B), and determines a second time difference between the second network restoration point and the second exit point. The terminal device determines a smallest time difference of the first time difference and the second time difference, and an exit parameter corresponding to the smallest time difference is an exit parameter obtained through self-learning.

Corresponding to Case 2 in 3.2.2, the terminal device collects exit parameters on site to obtain a curve, determines, by using historical exit parameters, that the curve is an exit curve, and determines an exit point based on the curve. The terminal device may compare the exit parameters collected on site with the historical exit parameters, to determine the most ideal exit parameter. For a specific process, refer to the description in the previous paragraph.

A third exit parameter self-learning manner is as follows: The terminal device sets (for example, in a manual manner) N exit parameters (N is an integer greater than or equal to 2), and selects an optimal exit parameter from the N exit parameters. The terminal device detects each set exit parameter to obtain an exit point, and records a corresponding network restoration point. For example, refer to Table 7, where one exit point and one network restoration point corresponding to each exit parameter are shown.

TABLE 7

| Exit parameter | Exit point | Network restoration point | Time difference $\Delta = (T2 - T1)$ |
|---|---|---|---|
| First exit parameter | T11 | T21 | $\Delta 1$ |
| Second exit parameter | T12 | T22 | $\Delta 2$ |
| Third exit parameter | T13 | T23 | $\Delta 3$ |

For each exit parameter, the terminal device may determine a time difference between the exit point and the network restoration point. Therefore, the terminal device obtains three time differences $\Delta 1$, $\Delta 2$, and $\Delta 3$. The terminal device may determine that an exit parameter corresponding to a time difference that is in $\Delta 1$, $\Delta 2$, and $\Delta 3$ and that is less than a threshold is an exit parameter obtained through self-learning. Alternatively, the terminal device determines a smallest value of $\Delta 1$, $\Delta 2$, and $\Delta 3$, and an exit parameter corresponding to the smallest value is an optimal exit parameter. Table 7 is used as an example. Assuming that $\Delta 2$ is the smallest, the second exit parameter is the exit parameter obtained through self-learning.

In a fourth self-learning manner, the terminal device sets (for example, in a manual manner) a plurality of exit parameters. The terminal device performs exit detection for a plurality of times by using each exit parameter, obtains one exit point in each exit detection, and records a corresponding network restoration point. Using four times as an example, the terminal device performs exit detection for four times by using each exit parameter, and obtains four exit points and four network restoration points. For example, refer to Table 8, where a plurality of exit points and a plurality of network restoration points corresponding to each exit parameter are shown.

TABLE 8

| Exit parameter | Exit detection times | Exit point T1 | Network restoration point T2 | Time difference $\Delta = (T2 - T1)$ | Mean square time difference |
|---|---|---|---|---|---|
| First exit parameter | First time | T1a | T2a | $\Delta 1a$ | X1 |
| | Second time | T1b | T2b | $\Delta 1b$ | |
| | Third time | T1c | T2c | $\Delta 1c$ | |
| | Fourth time | T1d | T2d | $\Delta 1d$ | |
| Second exit parameter | First time | T1e | T2e | $\Delta 1e$ | X2 |
| | Second time | T1f | T2f | $\Delta 1f$ | |
| | Third time | T1g | T2g | $\Delta 1g$ | |
| | Fourth time | T1h | T2h | $\Delta 1h$ | |
| Third exit parameter | First time | T1i | T2i | $\Delta 1i$ | X3 |
| | Second time | T1j | T2j | $\Delta 1j$ | |
| | Third time | T1k | T2k | $\Delta 1k$ | |
| | Fourth time | T1l | T2l | $\Delta 1l$ | |

For the first exit parameter, after each exit detection, a time difference between the exit point and the network restoration point is determined. Therefore, for each exit parameter, four time differences $\Delta$ are obtained in total, and a mean square time difference (or referred to as a mean square error of the time difference) may be obtained based on the four time differences $\Delta$: $X1 = \sqrt{\{(\Delta 1a)^2 + (\Delta 1b)^2 + (\Delta 1c)^2 + (\Delta 1d)^2\}/4}$.

Similarly, for the second exit parameter, a mean square time difference is $X2 = \sqrt{\{(\Delta 1e)^2 + (\Delta 1f)^2 + (\Delta 1g)^2 + (\Delta 1h)^2\}/4}$.

For the third exit parameter, a corresponding mean square time difference is $X3 = \sqrt{\{(\Delta 1i)^2 + (\Delta 1j)^2 + (\Delta 1k)^2 + (\Delta 1k)^2\}/4}$.

Therefore, the terminal device obtains three mean square time differences X1, X2, and X3. The terminal device determines that one of X1, X2, and X34 that is greater than a threshold is X2, and uses the second exit parameter as an exit parameter obtained through self-learning. Alternatively, the terminal device determines a smallest mean square error in X1, X2, and X34, and an exit parameter corresponding to the smallest mean square error is an exit parameter obtained through self-learning. For example, in Table 8, X2 is the smallest relative to X1 and X3, and it may be determined that the second exit parameter is the exit parameter obtained through self-learning.

It should be noted that, in the foregoing embodiment, the exit point and the network restoration point may be relative moments, for example, moments relative to a reference moment. A reference moment of the exit point includes a moment at which entering the fence is detected or a moment at which no network/a fall into a RAT is detected. A reference moment of the network restoration point includes the exit point, a moment at which entering the fence is detected, or a moment at which no network/a fall into a RAT is detected.

Figures 8, 9:
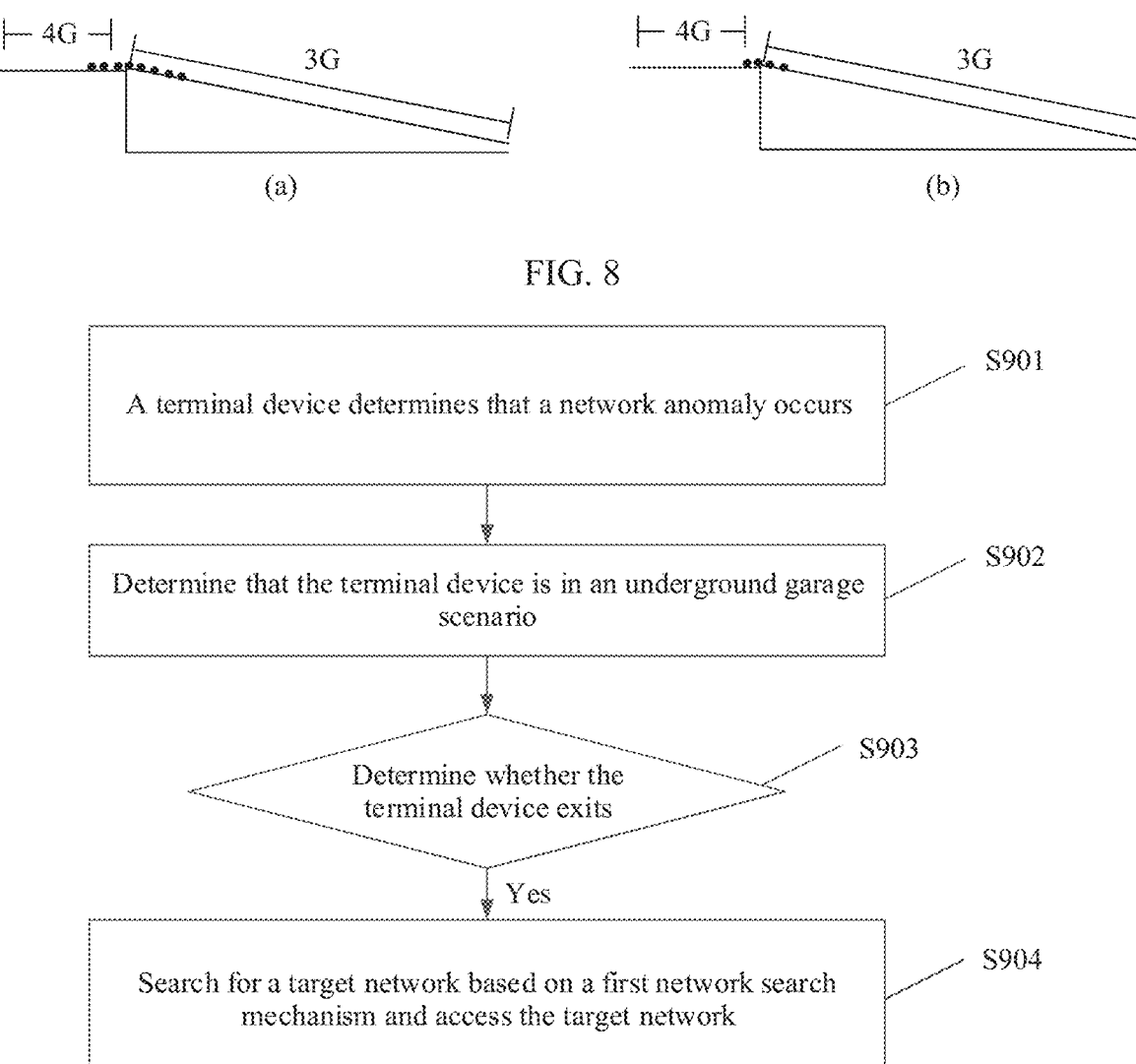
FIG. 8 is a schematic diagram of illustrating an effect of collecting an exit parameter obtained by a terminal device through self-learning according to an embodiment of this application.
FIG. 9 is a schematic diagram of a network search method in an underground garage scenario according to an embodiment of this application.

As an effect display diagram, refer to (a) in FIG. 8. A large quantity of exit points are detected in a self-learning process of the terminal device. The large quantity of exit points are detected by using different groups of values of exit parameters. For example, an entity black point in the figure represents an exit location corresponding to an exit point. For example, some black points are determined based on the foregoing first group of values (collection for four times may correspond to four black points), and some black points are obtained based on the foregoing second group of values (collection for four times may correspond to four black points). If some exit locations are far away from a high-RAT network, there is a relatively low probability that these exit locations access the high-RAT network as soon as possible. Alternatively, some exit locations are already within coverage of a high-RAT network, and if exit points corresponding to these exit locations are used as network search start moments, it is already late. Therefore, in this embodiment of this application, a relatively accurate value of the exit parameter is obtained in a self-learning manner. The relatively accurate value of the exit parameter may be understood as that an exit point at which a high-RAT network can be accessed as soon as possible can be obtained by using the value of the exit parameter. Refer to (b) in FIG. 8. A quantity of exit points is relatively small and converged (or centralized) compared with that in (a) in FIG. 8. At these exit points, a high-RAT network can be accessed as soon as possible. These exit points are exit points detected based on exit parameters obtained through self-learning.

The foregoing process in which the terminal device self-learns the value of the exit parameter may be implemented by using a loss function (loss function) or an objective function (objective function). The loss function or the objective function is an important equation used to find a smallest mean square time difference.

Optionally, the terminal device may self-learn the exit parameter, or the terminal device may report collected data to a cloud, and the cloud self-learns the exit parameter, and sends a self-learning result to the terminal device.

3.3 Exit Network Search

FIG. 9 is a schematic flowchart of a network search method according to an embodiment of this application. A procedure of the method includes the following steps.

S901: A terminal device determines that a network anomaly occurs.

For S901, refer to the description of S101 in the embodiment shown in FIG. 1. Details are not described herein again.

S902: The terminal device determines that the terminal device is in an underground garage scenario.

For S901, refer to the description in 3.1 in Embodiment 3. Details are not described herein again.

S903: The terminal device determines whether to exit.

For S903, refer to the description in 3.2 in Embodiment 3. Details are not described herein again.

S904: When exit is detected, the terminal device searches for and accesses a target network.

For S904, refer to the description of S102 in Embodiment 1. Details are not described herein again.

In this embodiment of this application, when the terminal device is in the underground garage scenario, the terminal device starts to search for a network of a target communications RAT at a specified time point (namely, an optimal network search time point). There is a time interval between the specified time point and an exit time point of the terminal device, and the specified time point is a time point after the exit time point. For example, the time interval is greater than or equal to 5 s.

The terminal device may search for the target network based on a first network search mechanism (searching for the target network below may also be referred to as specified network search for short). The first network search mechanism means, for example, starting specified network search at an optimal network search time point after an exit time point. The exit time point may be understood as a time point at which the terminal device detects exit. Certainly, the terminal device may alternatively perform the specified network search based on a second network search mechanism. The second network search mechanism means, for example, that the terminal device starts the specified network search at an optimal network search time point after a moment at which the terminal device is dropped from a network/falls into a lower RAT or after a moment at which the terminal device detects that the terminal device enters a fence in the underground garage scenario.

For the first network search mechanism, the optimal network search time point is any moment between a historical minimum success time point (denoted as minSus) and a historical maximum failure time point (denoted as maxFail), and minSus is later than maxFail. A garage is used as an example, minSus is the earliest historical moment at which the terminal device attempts to search for the target network and successfully accesses the target network after it is detected that the terminal device moves out of the garage, and maxFail is the latest historical moment at which the terminal device attempts to search for the target network but fails to access the target network after it is detected that the terminal device moves out of the garage. In other words, the terminal device starts the specified network search at a moment that is before minSus and after maxFail, to access the target network as timely as possible. Therefore, the terminal device needs to determine an optimal network search time point. Specifically, the optimal network search time point is determined in a plurality of manners. The following describes a plurality of manners of determining the optimal network search time point in a first trigger policy to a fourth trigger policy.

For the second network search mechanism, the optimal network search time point is any moment between a historical minimum success time point (denoted as minSus) and a historical maximum failure time point (denoted as maxFail), and minSus is later than maxFail, minSus is the earliest historical moment at which the terminal device attempts to search for the target network and successfully accesses the target network after a same network anomaly (same as the network anomaly that occurs in S901) occurs on the terminal device, and maxFail is the latest historical moment at which the terminal device attempts to search for the target network but fails to access the target network after the same network anomaly occurs on the terminal device.

Specifically, the optimal network search time point is determined in a plurality of manners. The following describes a plurality of manners of determining the optimal network search time point in a first trigger policy to a fourth trigger policy.

First Trigger Policy

In the first trigger policy, the terminal device may self-learn the optimal network search time point. The optimal network search time point may be understood as follows: After detecting an exit point, the terminal device triggers specified network search when the optimal network search time point is reached, so that the terminal device can access a high-RAT network as soon as possible. Different underground garages correspond to different optimal network search time points. Therefore, for each garage, the terminal device may self-learn an optimal network search time point.

Figure 10:
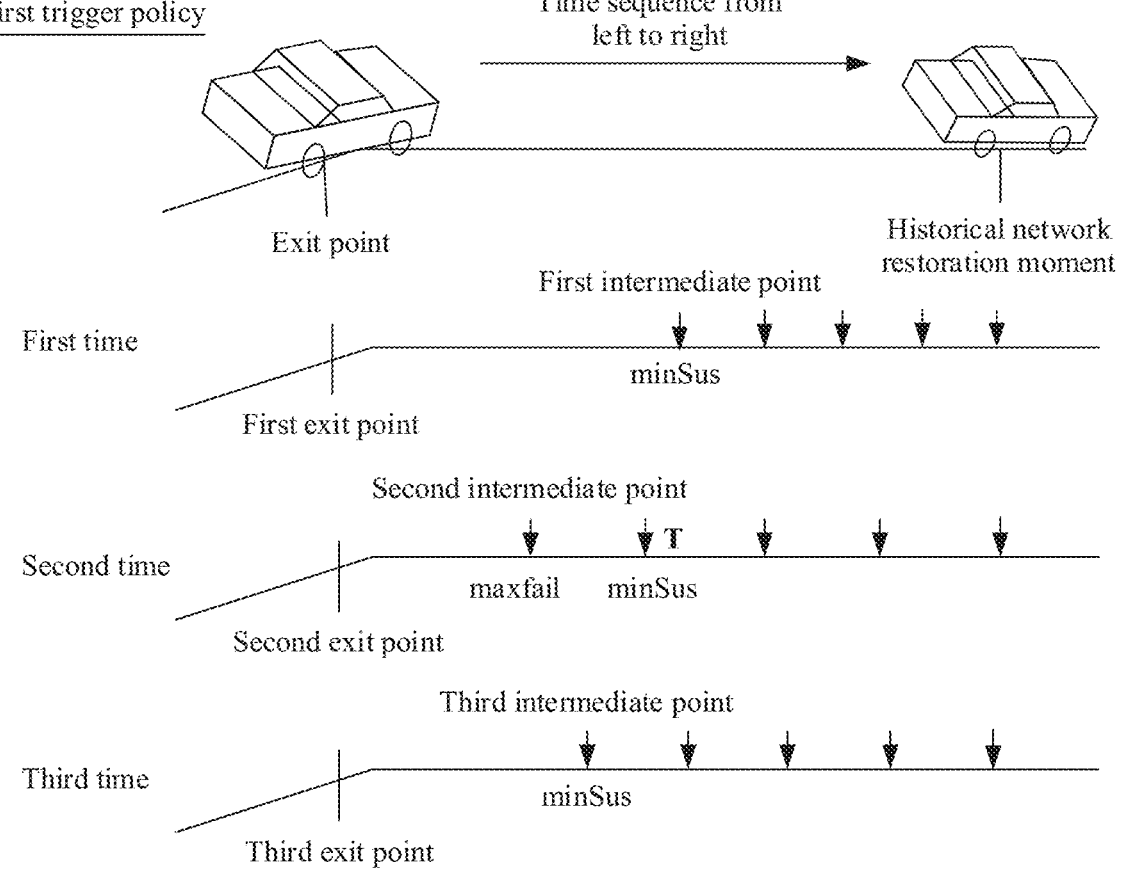
FIG. 10 is a schematic diagram of self-learning an optimal network search time point in an underground garage scenario according to an embodiment of this application.

The following describes a process in which a terminal device self-learns an optimal network search time point. FIG. 10 is a schematic diagram of a first trigger policy. In the first trigger policy, a historical network restoration moment needs to be used. The historical network restoration moment is first described. Table 8 is used as an example. Assuming that the terminal device self-learns that a second exit parameter is an optimal exit parameter, an average moment of four time differences ($\Delta$1e, $\Delta$1f, $\Delta$1g, and $\Delta$1h) corresponding to the second exit parameter is the historical network restoration moment.

The following uses a garage as an example to describe a process in which the terminal device self-learns an optimal network search time point. Therefore, each self-learning process in the following is for a same garage, namely, the garage. First self-learning, second self-learning, and the like in the following are different self-learning, and may be discontinuous in terms of time.

First Self-Learning:

When a user drives into a garage, no network or a fall into a lower RAT occurs. The terminal device detects a first exit point. The terminal device uses the first exit point as a start point, and uses a historical network restoration moment as an end point, or uses a preset moment after a historical network moment (for example, 10 s or 10 ms after the historical network restoration moment) as an end point. The terminal device determines a first intermediate point between the start point and the end point, and equally divides duration between the first intermediate point and the end point into L time intervals, where L is an integer greater than or equal to 2, for example, L=5. If the L time intervals correspond to L trigger occasions, the terminal device triggers first network search on a first trigger occasion (namely, the first intermediate point). Assuming that a network is successfully restored after network search is triggered at the first intermediate point, the first intermediate point is denoted as a minimum successful attempt point (minSus).

Second Self-Learning:

When the user drives into the same garage again, no network or a fall into a lower RAT occurs again. The terminal device detects a second exit point. Absolute moments corresponding to the second exit point and the first exit point are different, and relative moments may be the same or different. For the relative moments, refer to the foregoing descriptions. A second intermediate point is determined between the second exit point and minSus, namely, the first intermediate point. Duration between the second intermediate point and the historical network restoration moment or a preset moment (for example, the preset moment is 10 ms or 10 s) before the historical network restoration moment is equally divided into L time intervals (for example, L is 5). If the L time intervals correspond to L trigger occasions, the terminal device triggers the first network search on a first trigger occasion (namely, the second intermediate point). It is assumed that triggering at the second intermediate point fails, and the second intermediate point is recorded as a maximum failure attempt point (maxfail). In this case, the terminal device triggers network search at a second trigger occasion (T in the figure). If the network is successfully restored, minSus is updated to a moment (namely, T) corresponding to the second trigger occasion, or updated to a moment between the first intermediate point and T, for example, an intermediate moment between the first intermediate point and T.

Third Self-Learning:

When the user drives into the same garage again, no network or a fall into a lower RAT occurs again. When the terminal device detects a third exit point, the terminal device determines a third intermediate point between maxfail (namely, the second intermediate point) and an updated minSus (namely, the moment T corresponding to the second trigger occasion), equally divides duration between the third intermediate point and the historical network restoration moment or a preset moment before the historical network restoration moment (for example, the preset moment is 10 ms or 10 s) into L time intervals, and triggers network search by using the same principle. Assuming that a network is successfully restored after network search is triggered at the third intermediate point, minSus is updated to the third intermediate point. In this case, maxfail is updated to the second time point, and minSus is updated to the third intermediate point.

Assuming that a time difference between an updated maxfail (namely, the second intermediate point) and an updated minSus (namely, the third intermediate point) is less than a threshold, maxfail and minSus do not need to be continuously updated. The updated minSus is used as an optimal network search time point learned by the terminal device.

In a subsequent process, after detecting an exit point, the terminal device perform specified network search based on L same time intervals, namely, L trigger occasions, between the optimal network search time point and the historical network restoration moment or a preset moment (for example, the preset moment is 10 ms or 10 s) before the historical network restoration moment.

Still refer to FIG. 10. In the first self-learning, the terminal device starts the specified network search at the first intermediate point. In the second self-learning, the terminal device starts the specified network search at the second intermediate point. A time difference between the first intermediate point and the second intermediate point is relatively large. In the third self-learning, the terminal device starts the specified network search at the third intermediate point. A difference between the third intermediate point and the second intermediate point decreases. It can be learned that a moment for starting the specified network search gradually converges to a relatively small range. Therefore, the moment for starting the specified network search (the optimal network search time point) determined in this manner is relatively accurate. In other words, as a quantity of times that the terminal device enters the garage increases, a time difference between moments for twice adjacent specified network search is gradually reduced.

Second Trigger Policy

FIG. 11 is a schematic flowchart of a second trigger policy.

S1100: A terminal device enters an underground garage.

S1101: After detecting an exit point, the terminal device starts a timer to start timing.

S1102: When the timer reaches a first trigger time point (Ttrigger), specified network search is triggered.

Optionally, the first Ttrigger may be a default fixed value, for example, a preset time point after the exit point; or the first Ttrigger may be an intermediate moment between a historical network restoration moment and the exit point detected in S1101.

S1103: The terminal device determines whether a network is successfully restored. If the network is successfully restored, perform step 1104, or if the network is not successfully restored, perform step 1105.

S1104: Set a second Ttrigger when the terminal device successfully restores the network, where the second Ttrigger is earlier than the first Ttrigger. The second Ttrigger is used to: when the terminal device detects an exit point when moving out of the underground garage next time, start the timer. When the timer reaches the second Ttrigger, specified network search is triggered.

Because the terminal device triggers the specified network search at the first Ttrigger and successfully accesses a high-RAT network, to access the high-RAT network earlier, the second Ttrigger may be a moment before the first Ttrigger. In other words, after the terminal device detects the exit point, the specified network search may be triggered in advance compared with the first Ttrigger. Optionally, the second Ttrigger may be any moment before the first Ttrigger, or the second Ttrigger may be an intermediate moment between the first Ttrigger and the exit point.

In this embodiment of this application, step 1104 may not be performed. In other words, step 1104 is an optional step. Therefore, step 1104 in FIG. 11 is represented by a dashed line.

S1105: When the terminal device fails to restore the network, and the timer reaches a third Ttrigger, the specified network search is triggered again, where the third Ttrigger is later than the first Ttrigger.

Optionally, the third Ttrigger is a moment after the first Ttrigger; or the third Ttrigger is an intermediate moment between the first Ttrigger and the historical network restoration moment.

Figures 12, 13:
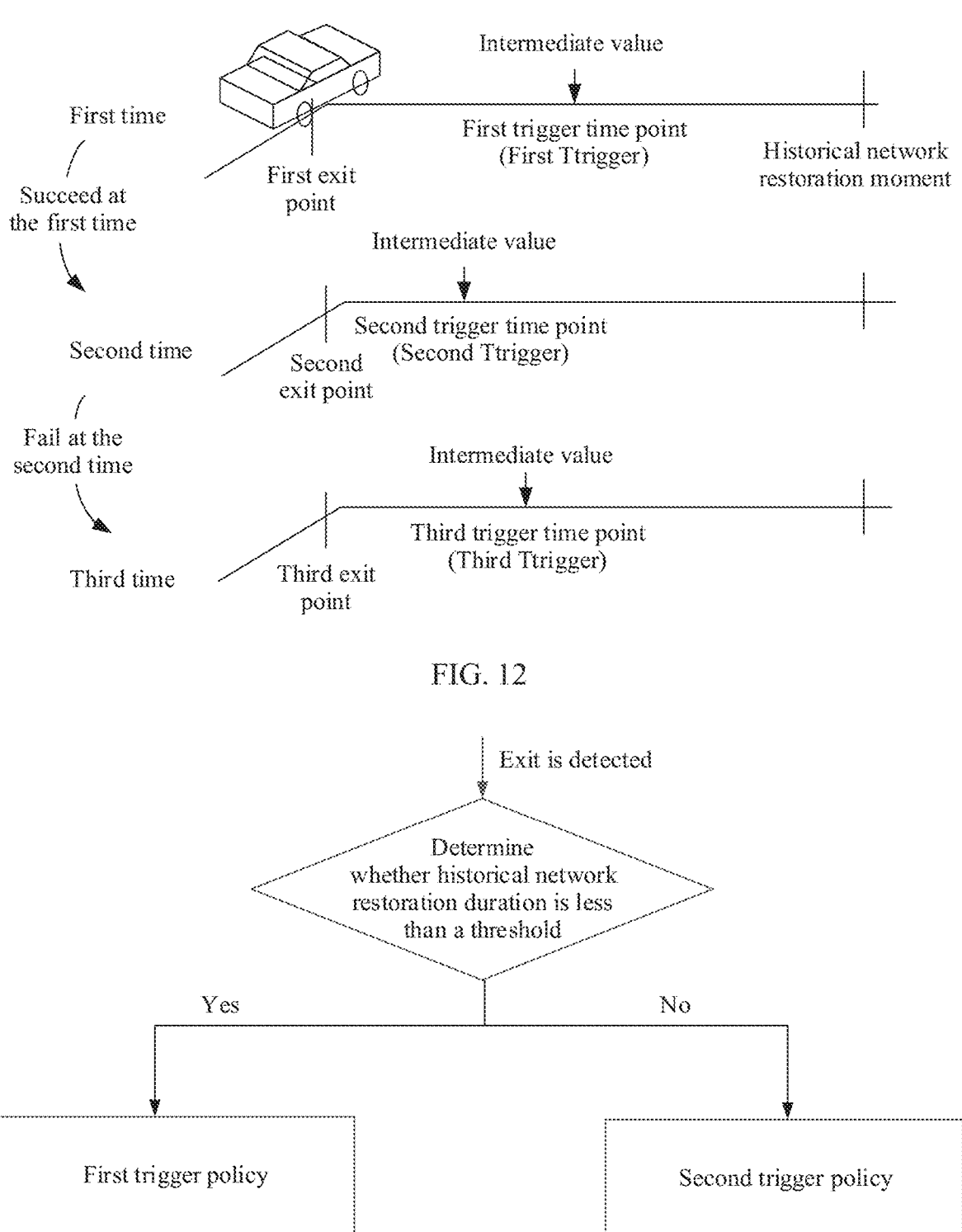
FIG. 12 is another schematic diagram of self-learning an optimal network search time point in an underground garage scenario according to an embodiment of this application.
FIG. 13 is a schematic diagram of selecting a first trigger policy or a second trigger policy according to an embodiment of this application.

Based on a principle of the second trigger policy, the terminal device may alternatively obtain the optimal network search time point through self-learning. FIG. 12 shows an example in which the terminal device self-learns the optimal network search time point. In the following, each self-learning process may be understood as that the terminal device performs one exit detection and one specified network search for a same garage. The first self-learning, the second self-learning, and the like may be discontinuous in terms of time. For example, the first self-learning occurs in the morning of January 1, and the second self-learning occurs in the morning of January 2.

First Self-Learning:

When a user drives into a garage, no network or a fall into a lower RAT occurs. The terminal device detects a first exit point and starts the timer. When the timer reaches the first Ttrigger, the specified network search is triggered. Optionally, the first Ttrigger may be a default value, for example, a preset time point after the first exit point; or the first Ttrigger may be an intermediate moment between the historical network restoration moment and the first exit point. It is assumed that when the timer reaches the first Ttrigger, the terminal device triggers the specified network search and successfully restores the network. In this case, after entering the garage next time, the terminal device may perform the following second self-learning process.

Second Self-Learning:

When the user drives into the same garage again, no network or a fall into a lower RAT occurs again. The terminal device detects a second exit point, starts the timer, and triggers the specified network search when the timer reaches the second Ttrigger. The second Ttrigger is earlier than the first Ttrigger. Optionally, the second Ttrigger may be any moment before the first Ttrigger, or the second Ttrigger may be an intermediate moment between the first Ttrigger and the second exit point. It is assumed that when the timer reaches the second Ttrigger, the terminal device triggers the specified network search but fails to restore the network, and performs a third self-learning process.

Third Self-Learning:

When the user drives into the same garage again, no network or a fall into a lower RAT occurs again. The terminal device detects a third exit point, starts the timer, and triggers the specified network search when the timer reaches the third Ttrigger. The third Ttrigger is later than the second Ttrigger. Optionally, the third Ttrigger is a moment after the second Ttrigger; or the third Ttrigger is an intermediate moment between the second Ttrigger and the first Ttrigger.

It is assumed that when the timer reaches the third Ttrigger, the terminal device successfully accesses the network after triggering the specified network search, and a time difference between the third Ttrigger and the second Ttrigger is less than a threshold. In this case, it is determined that the third Ttrigger is the optimal network search time point self-learned by the terminal device.

Still refer to FIG. 12. In the first self-learning, the terminal device starts the specified network search at the first Ttrigger. In the second self-learning, the terminal device starts the specified network search at the second Ttrigger. A time difference between the first Ttrigger and the second Ttrigger is relatively large. In the third self-learning, the terminal device starts the specified network search at the third Ttrigger. A difference between the third Ttrigger and the second Ttrigger decreases. It can be learned that a moment for starting the specified network search gradually converges to a relatively small range. Therefore, the moment for starting the specified network search determined in this manner is relatively accurate. In other words, as a quantity of times that the terminal device enters the garage increases, a time difference between moments for twice adjacent specified network search is gradually reduced.

It should be noted that, in some embodiments, the terminal device may use either of the first trigger policy and the second trigger policy. Alternatively, refer to FIG. 13, where the terminal device determines whether historical network restoration duration is less than a threshold, and if yes, the first trigger policy is used, or if no, the second trigger policy is used. The historical network restoration duration is duration between the exit point and the historical network restoration moment. This is because if the historical network restoration duration is greater than the threshold, it indicates that a network restoration point is relatively far away from the exit point and a range is relatively large. To quickly find an optimal network search time point, an approximate range of a network search time point can be quickly positioned by using the second trigger policy (namely, in a manner of obtaining an intermediate moment between the second Trigger and the first Trigger). If the historical network restoration duration is less than the threshold, it indicates that a network restoration point is relatively close to the exit point and a range is relatively small. If the first trigger policy (network search is triggered at a same time interval) is used, a relatively fine-grained network search time point may be determined, that is, an accurate network search time point can be obtained.

Embodiment 4: Non-Underground Garage Scenario

A non-underground garage scenario is, for example, the foregoing problem area on the driving route. In this embodiment, a network search manner after a network anomaly occurs on a terminal device in a non-underground garage scenario is described, and specifically includes identification of the non-underground garage scenario, a network search process in the non-underground garage scenario, and the like.

4.1. Identification of a Non-Underground Garage Scenario

Manner 1: The terminal device detects that the terminal device enters a fence, and determines, based on the fence, that the terminal device is in the non-underground garage scenario.

Manner 2: Considering that in a driving route, a journey is usually relatively flat, and motion data (for example, an attitude angle) does not change obviously in a driving process of a vehicle. Therefore, whether the terminal device is in the non-ground underground garage scenario may be determined by using the motion data. For example, if a network anomaly occurs on the terminal device on the driving route, but it is determined, by using the collected motion data, that a change of the motion data is relatively small (which indicates that the driving route is relatively flat), it is determined that the terminal device is in the non-underground garage scenario.

4.2. Network Search Manner in a Non-Underground Garage Scenario

Figure 14:
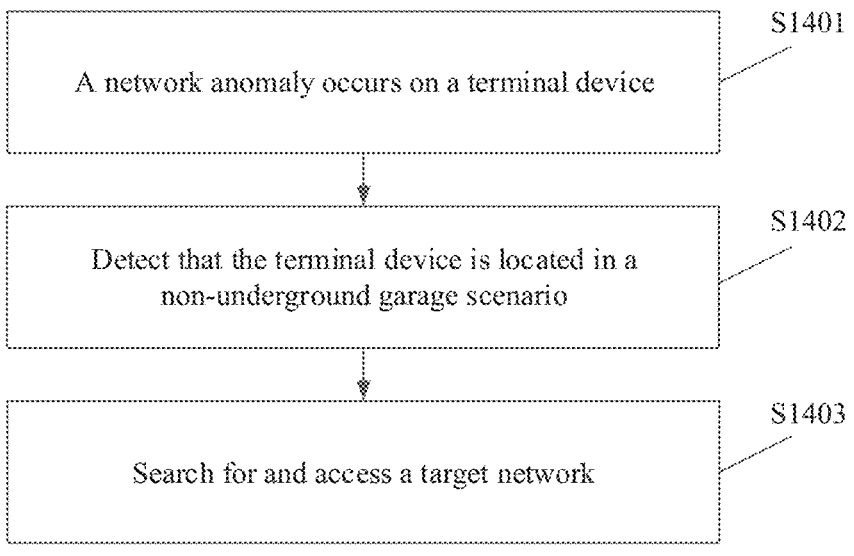
FIG. 14 is a schematic diagram of a network search method in a non-underground garage scenario according to an embodiment of this application.

FIG. 14 is a schematic flowchart of a network search method according to an embodiment of this application. A procedure of the method includes the following steps.

S1401: A terminal device determines that a network anomaly occurs.

S1402: The terminal device determines that the terminal device is in a non-underground garage scenario.

For an implementation of S1402, refer to the foregoing identification process of the non-underground garage scenario. Details are not described herein again.

S1403: The terminal device searches for and accesses a target network.

In this embodiment of this application, when the terminal device is in the non-underground garage scenario, the terminal device starts to search for a network of a target communications RAT at a specified time point (namely, an optimal network search time point). There is a time interval between the specified time point and a time point at which a network anomaly occurs on the terminal device, and the specified time point is a time point after the time point at which the network anomaly occurs. The time interval is greater than or equal to 5 s.

The terminal device may search for and access the target network based on a second network search mechanism. The second network search mechanism means that the terminal device starts specified network search at the optimal network search time point after a moment at which entering a fence is detected or a moment of no network/a fall into a lower RAT. Specifically, the terminal device has two trigger policies to trigger the specified network search, namely a third trigger policy and a fourth trigger policy.

Alternatively, when determining that a network anomaly occurs, the terminal device directly starts the specified network search at the optimal network search time point without determining whether there is a non-underground garage scenario. The optimal network search moment is after a moment of no network/a fall into a lower RAT or after a moment at which entering a fence in a non-underground garage is detected. For a manner of determining the optimal network search time point, refer to the third trigger policy or the fourth trigger policy below.

Third Trigger Policy

Similar to the first trigger policy, the terminal device self-learns the optimal network search time point. The optimal network search time point may be understood as follows; After a moment of no network/a fall into a lower RAT or after a moment at which entering a fence is detected, the terminal device waits for the optimal network search time point to trigger specified network search, so that the terminal device can access a high-RAT network as soon as possible.

Figure 15:
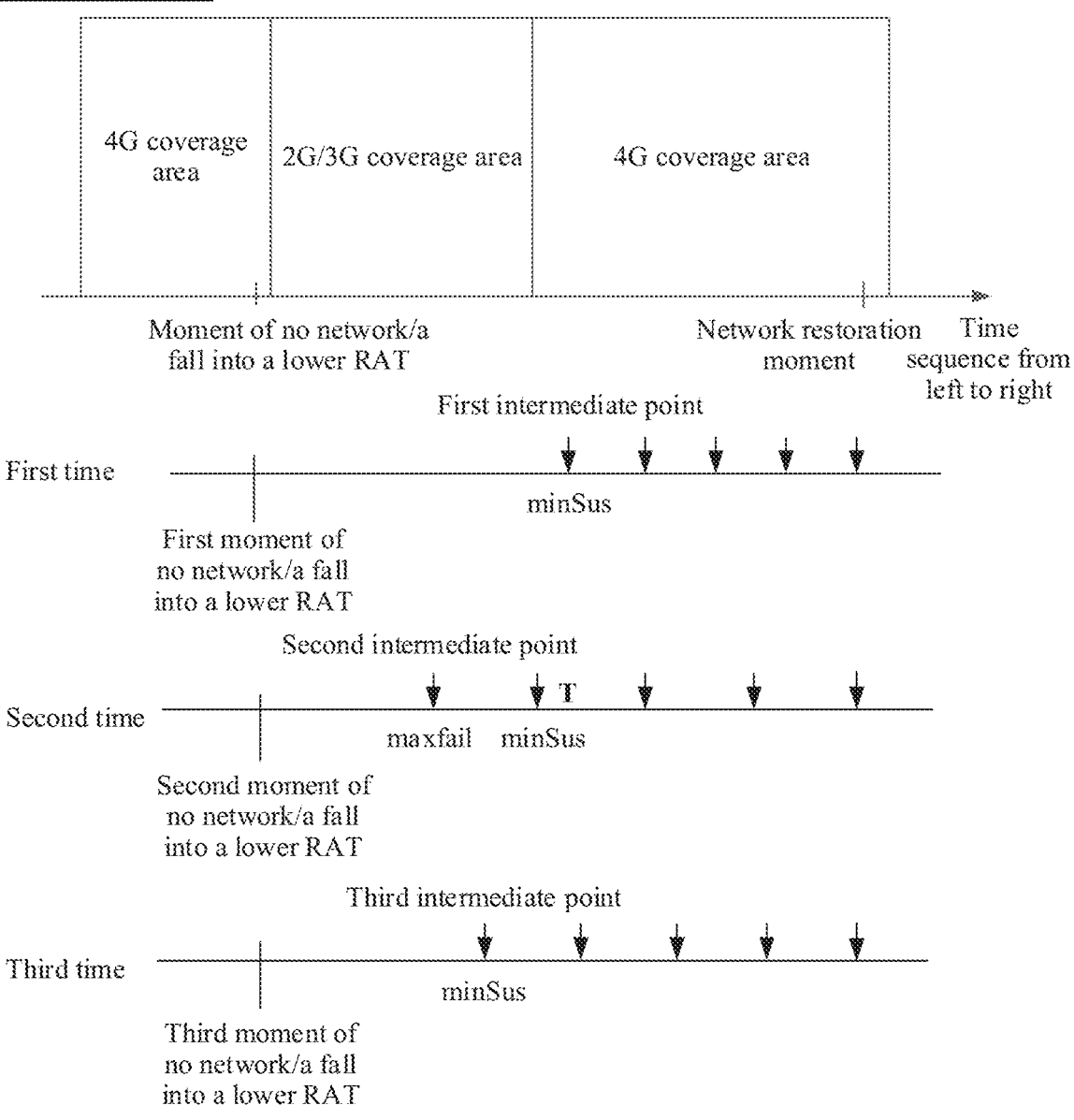
FIG. 15 is a schematic diagram of self-learning an optimal network search time point in a non-underground garage scenario according to an embodiment of this application.

FIG. 15 is a schematic diagram of a third trigger policy. FIG. 15 shows a driving route. The driving route includes a 4G coverage area, a 2G/3G coverage area, and a 4G coverage area. A network anomaly occurs in a process in which the terminal device moves from a 4G coverage area to a 2G/3G coverage area, and the network anomaly includes no network or a fall into a lower RAT. The network is restored when the terminal device moves from the 2G/3G coverage area to the 4G coverage area.

Similar to the first trigger policy, a historical network restoration moment needs to be used in the third trigger policy. The driving route shown in FIG. 15 is used as an example. In a process of detecting a fence corresponding to the driving route, the terminal device records a moment of no network/a fall into a lower RAT, and further records a network restoration moment. Therefore, the terminal device may record at least one network restoration moment corresponding to the driving route. When a plurality of network restoration moments are recorded, the historical network restoration moment may be an average moment of the plurality of recorded network restoration moments or an earliest moment or a latest moment in the plurality of network restoration moments.

The following uses the driving route shown in FIG. 15 as an example to describe a process in which the terminal device self-learns an optimal network search time point.

First Self-Learning:

When a user drives through the driving route in FIG. 15, the terminal device is dropped from a network/falls into a lower RAT. The terminal device detects a first moment of no network/a fall into a lower RAT, and uses the first moment of no network/a fall into a lower RAT as a start point and a historical network restoration moment as an end point, or uses a preset moment after the historical network moment (for example, 10 s or 10 ms after the historical network restoration moment) as an end point. The terminal device determines a first intermediate point between the start point and the end point, and equally divides duration between the first intermediate point and the end point into L time intervals, where L is an integer greater than or equal to 2, for example, L=5. If the L time intervals correspond to L trigger occasions, the terminal device triggers first network search on a first trigger occasion (namely, the first intermediate point). Assuming that a network is successfully restored after network search is triggered at the first intermediate point, the first intermediate point is referred to as a minimum successful attempt point (minSus).

Second Self-Learning:

When the user drives through the driving route in FIG. 15 again, the terminal device is dropped from a network/falls into a lower RAT again. The terminal device detects a second moment of no network/a fall into a lower RAT, determines a second intermediate point between the second moment of no network/a fall into a lower RAT and minSus, namely, the first intermediate point, and equally divides duration between the second intermediate point and the historical network restoration moment or a preset moment (for example, the preset moment is 10 ms or 10 s) before the historical network restoration moment into L time intervals. If the L time intervals correspond to L trigger occasions, the terminal device triggers first network search on a first trigger occasion (namely, the second intermediate point).

It is assumed that triggering fails at the second intermediate point fails, and the second intermediate point is referred to as a maximum failure attempt point (maxfail). In this case, the terminal device triggers network search at a second trigger occasion (namely, T in the figure). If the network is successfully restored, minSus is updated to a moment (namely, T) corresponding to the second trigger occasion.

Third Self-Learning:

When the user drives through the driving route in FIG. 15 again, the terminal device is dropped from a network/falls into a lower RAT again. The terminal device detects a third moment of no network/a fall into a lower RAT, determines a third intermediate point between maxfail (namely, the second intermediate point) and an updated minSus (namely, the moment T corresponding to the second trigger occasion), equally divides duration between the third intermediate point and the historical network restoration moment or a preset moment (for example, the preset moment is 10 ms or 10 s) before the historical network restoration moment into L time intervals, and triggers network search by using the same principle. Assuming that a network is successfully restored after network search is triggered at the third intermediate point, minSus is updated to the third intermediate point. In this case, maxfail is updated to the second time point, and minSus is updated to the third intermediate point.

Assuming that a time difference between an updated maxfail (namely, the second intermediate point) and an updated minSus (namely, the third intermediate point) is less than a threshold, maxfail and minSus do not need to be continuously updated. The updated minSus is used as an optimal network search time point learned by the terminal device.

In a subsequent process, after detecting a moment of no network/a fall into a lower RAT, the terminal device equally divides duration between an optimal network search time point and the historical network restoration moment or the preset moment (for example, the preset moment is 10 ms or 10 s) before the historical network restoration moment into L time intervals, and triggers network search by using a same principle.

Fourth Trigger Policy

Figure 16:
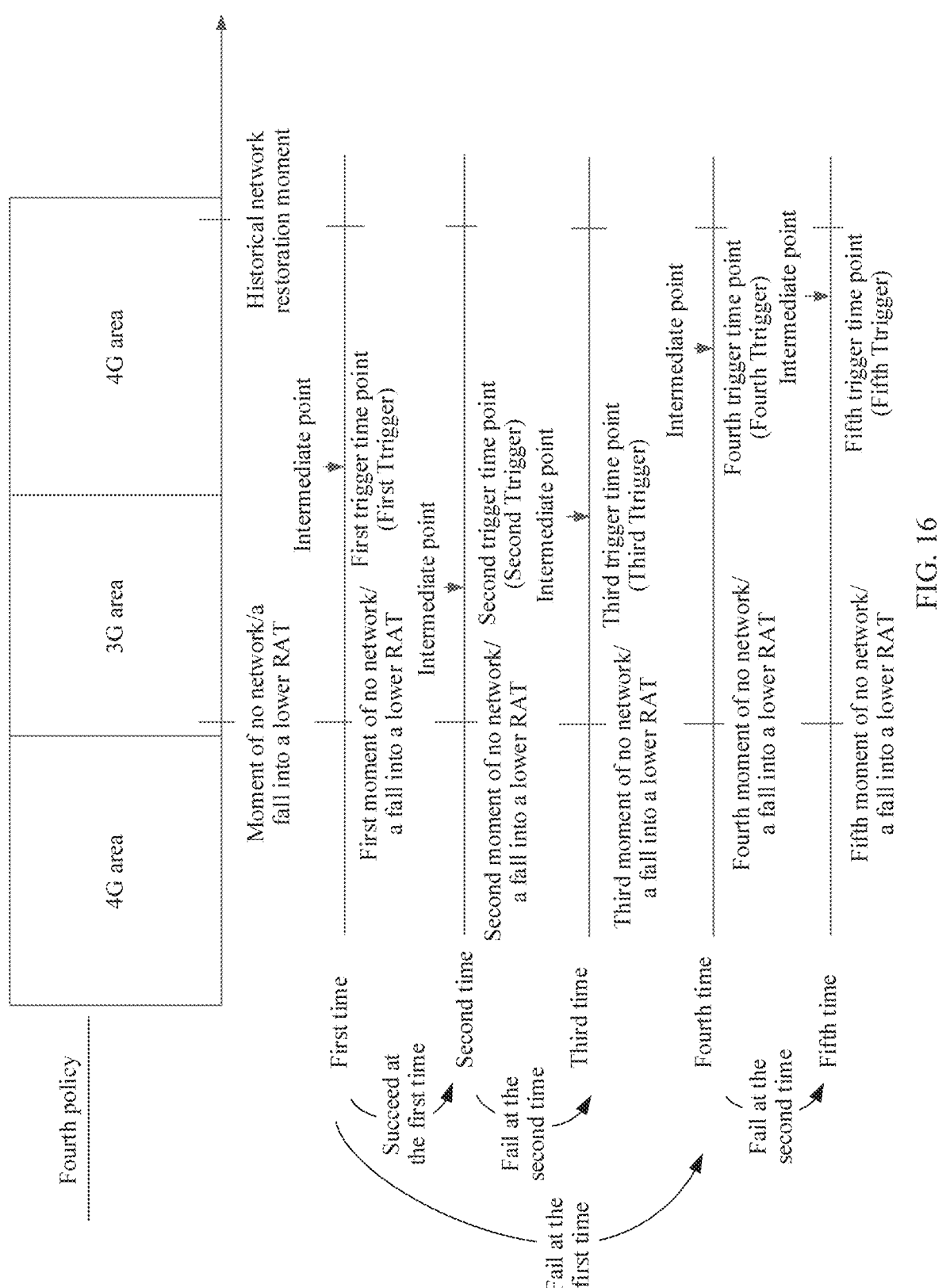
FIG. 16 is another schematic diagram of self-learning an optimal network search time point in a non-underground garage scenario according to an embodiment of this application.

In the fourth trigger policy, the terminal device may also self-learn the optimal network search time point. The following describes a process in which the terminal device self-learns the optimal network search time point in the fourth trigger policy. FIG. 16 is a schematic diagram of a fourth trigger policy.

First Self-Learning:

When a user drives through a driving route in FIG. 16, the terminal device is dropped from a network/falls into a lower RAT. The terminal device detects a first moment at which the terminal device is dropped from a network/falls into a lower RAT, and starts a timer. When the timer reaches first Ttrigger, specified network search is triggered. Optionally, the first Ttrigger may be a default value, for example, a preset time point after a moment of no network/a fall into a lower RAT; or the first Ttrigger may be an intermediate moment between a historical network restoration moment and a first moment of no network/a fall into a lower RAT. It is assumed that when the timer reaches the first Ttrigger, the terminal device triggers the specified network search and successfully restores the network, and the following second self-learning process is performed. It is assumed that when the timer reaches the first Ttrigger, the terminal device does not successfully restore the network after triggering the specified network search, and the following fourth self-learning process is performed.

Second Self-Learning:

The user drives through the driving route in FIG. 16 again, and the terminal device is dropped from a network/falls into a lower RAT again. The terminal device detects a second moment at which the terminal device is dropped from a network/falls into a lower RAT, and starts the timer. When the timer reaches second Ttrigger, specified network search is triggered. The second Ttrigger is earlier than the first Ttrigger. Optionally, the second Ttrigger may be any moment before the first Ttrigger, or the second Ttrigger may be an intermediate moment between the first Ttrigger and a second moment of no network/a fall into a lower RAT. It is assumed that when the timer reaches the second Ttrigger, the terminal device triggers the specified network search but fails to restore the network, and performs a third self-learning process.

Third Self-Learning:

The user drives through the driving route in FIG. 16 again, and the terminal device is dropped from a network/falls into a lower RAT again. The terminal device detects a third moment at which the terminal device is dropped from a network/falls into a lower RAT, and starts the timer. When the timer reaches third Ttrigger, specified network search is triggered. The third Ttrigger is later than the second Ttrigger. Optionally, the third Ttrigger is a moment after the second Ttrigger; or the third Ttrigger is an intermediate moment between the second Ttrigger and the first Ttrigger. It is assumed that when the timer reaches the third Ttrigger, the terminal device successfully accesses the network after triggering the specified network search, and a time difference between the third Ttrigger and the second Ttrigger is less than a threshold. In this case, it is determined that the third Ttrigger is the optimal network search time point.

Fourth Self-Learning:

The user drives through the driving route in FIG. 16 again, and the terminal device is dropped from a network/falls into a lower RAT again. The terminal device detects a fourth moment at which the terminal device is dropped from a network/falls into a lower RAT, and starts the timer. When the timer reaches fourth Ttrigger, specified network search is triggered. The fourth Ttrigger is later than the first Ttrigger. Optionally, the fourth Ttrigger may be any moment after the first Ttrigger, or the fourth Ttrigger may be an intermediate moment between the first Ttrigger and the historical network restoration moment. It is assumed that when the timer reaches the fourth Ttrigger, the terminal device triggers the specified network search but fails to restore the network, and performs a fifth self-learning process.

Fifth Self-Learning:

The user drives through the driving route in FIG. 16 again, and the terminal device is dropped from a network/falls into a lower RAT again. The terminal device detects a fifth moment at which the terminal device is dropped from a network/falls into a lower RAT, and starts the timer. When the timer reaches fifth Ttrigger, specified network search is triggered. The fifth Ttrigger is later than the fourth Ttrigger. Optionally, the fifth Ttrigger is a moment after the fourth Ttrigger; or the fifth Ttrigger is an intermediate moment between the fourth Ttrigger and the historical network restoration moment.

It is assumed that when the timer reaches the fifth Ttrigger, the terminal device successfully accesses the network after triggering the specified network search, and a time difference between the fifth Ttrigger and the fourth Ttrigger is less than a threshold. In this case, it is determined that the fifth Ttrigger is the optimal network search time point.

In some other embodiments, after the terminal device is dropped from a network or falls into a lower RAT, the terminal device may slow down. In this case, a moving speed of the terminal device slows down, and the terminal device may fail to access a network until the optimal network search time point. Therefore, the terminal device may trigger the specified network search when detecting that a change value of a signal strength of a serving cell and/or a neighboring cell is greater than a threshold.

Figure 17:
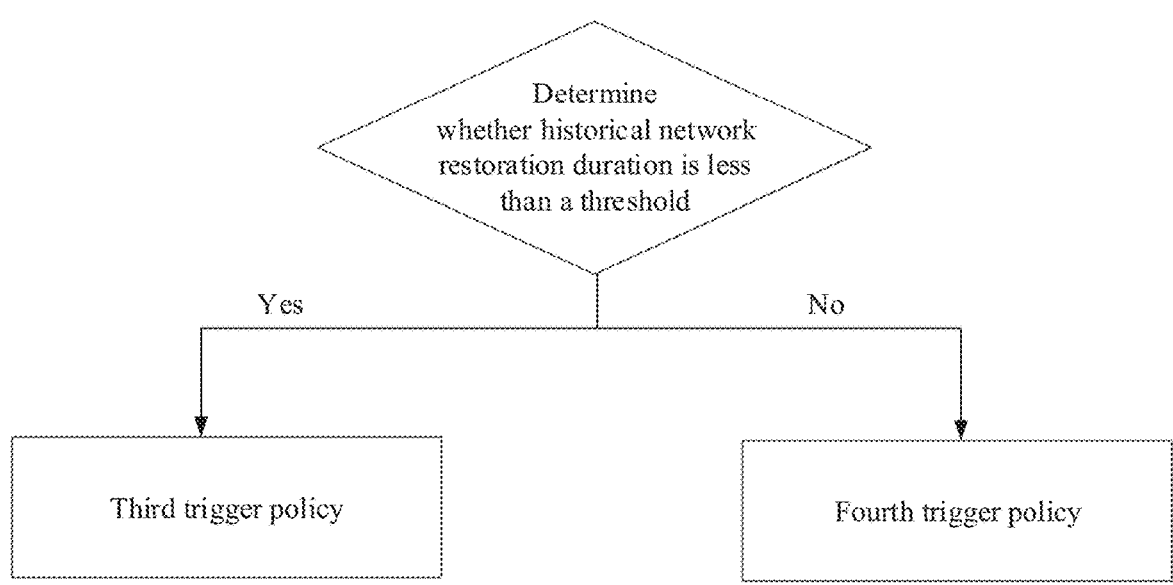
FIG. 17 is a schematic diagram of selecting a third trigger policy or a fourth trigger policy according to an embodiment of this application.

It should be noted that, in some embodiments, the terminal device may use either of the third trigger policy and the fourth trigger policy. Alternatively, refer to FIG. 17, where the terminal device determines whether historical network restoration duration is less than a threshold, and if yes, the third trigger policy is used, or if no, the fourth trigger policy is used. The historical network restoration duration is duration between a moment of no network/a fall into a lower RAT and the historical network restoration moment. This is because if the historical network restoration duration is greater than the threshold, it indicates that a network restoration point is relatively far away from an exit point and a range is relatively large. To quickly find an optimal network search time point, an approximate range of a network search time point can be quickly positioned by using the fourth trigger policy (namely, in a manner of obtaining an intermediate moment between the second Trigger and the first Trigger). If the historical network restoration duration is less than the threshold, it indicates that a network restoration point is relatively close to the exit point and a range is relatively small. If the third trigger policy (network search is triggered at a same time interval) is used, a relatively fine-grained network search time point may be determined, that is, an accurate network search time point can be obtained.

In the foregoing embodiment, similarly, as a quantity of learning times increases, a difference between two network search time points (a relative time point, for example, a relative time point of no network or a fall into a lower RAT) is gradually reduced.

Figure 18:
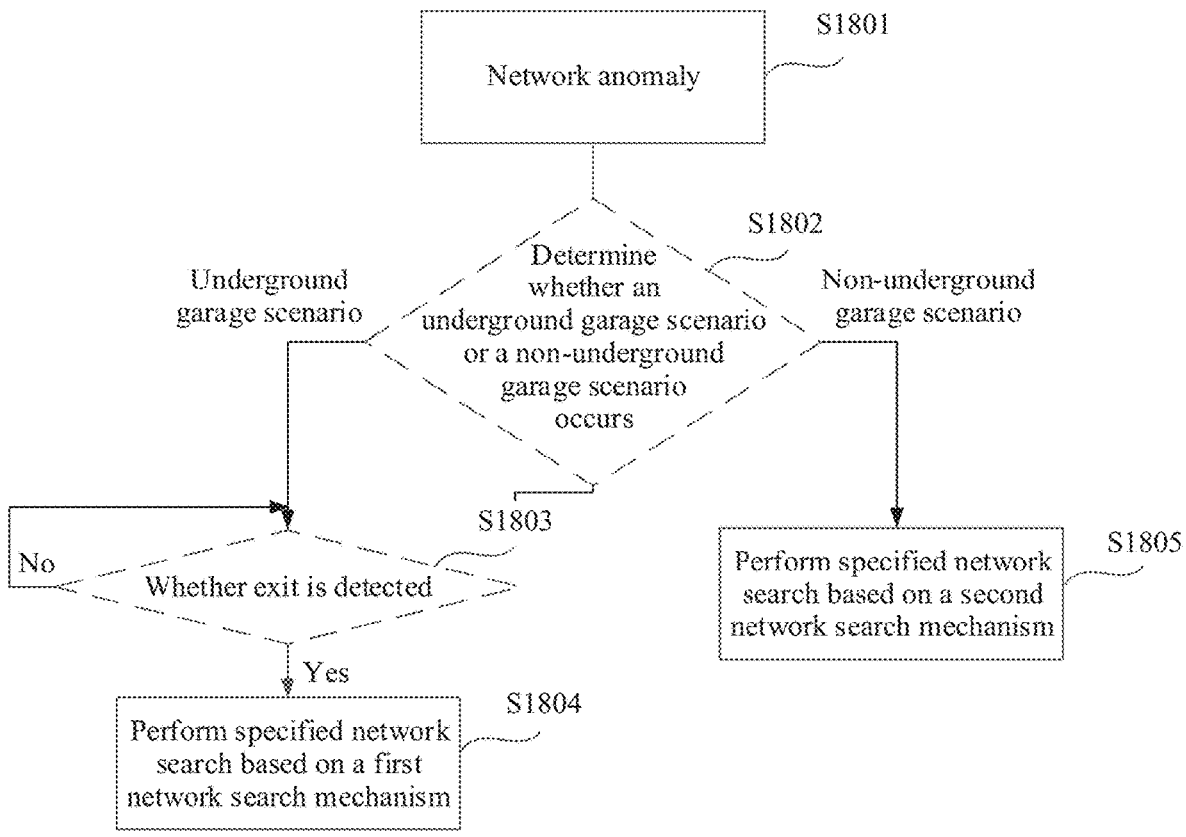
FIG. 18 is a schematic diagram of still another network search method according to an embodiment of this application.

The following describes an example according to an embodiment of this application. FIG. 18 is a schematic flowchart of a network search method according to an embodiment of this application. A procedure of the method includes the following steps.

S1801: A network anomaly occurs on a terminal device.

S1802: The terminal device determines whether the terminal device is in an underground garage scenario or a non-underground garage scenario.

S1803: When it is determined that the terminal device is in the underground garage scenario, the terminal device detects whether the terminal device exits; and if it is detected that the terminal device exits, S1804 is performed; or if it is detected that the terminal device does not exit, S1803 continues to be performed.

S1802 may not need to be performed, that is, network search of a target network is directly performed without determining the scenario. In this case, S1803 is also an optional step.

S1804: The terminal device searches for and accesses the target network based on a first network search mechanism.

S1805: The terminal device searches for and accesses the target network based on a second network search mechanism.

If the terminal device is in the underground garage scenario and is in an idle mode, the terminal device searches for a network based on the first network search mechanism. To be specific, the terminal device starts to search for a network of a target communications RAT at a third time point, there is a second time interval between the third time point and a fourth time point, the fourth time point is a time point at which the terminal device exits, and the third time point is a time point after the fourth time point. For details, refer to the foregoing description of the first network search mechanism.

If the terminal device is not in the underground garage scenario and is in an idle mode, the terminal device searches for a network based on the second network search mechanism, that is, starts to search for a network of a target communications RAT at a first time point. There is a first time interval between the first time point and a second time point, the second time point is a time point at which a network anomaly occurs on the terminal device, and the first time point is a time point after the second time point. For details, refer to the foregoing description of the second network search mechanism.

It should be noted that, in the embodiment in FIG. 18, an execution sequence between S1801 and step S1802 is not limited. For example, the terminal device first performs S1801 and then performs S1802, that is, when a network anomaly occurs, scenario detection is triggered. For another example, the terminal device first performs S1802 and then performs S1801. To be specific, the terminal device performs scenario detection in real time. When the underground garage scenario is detected, the terminal device determines whether a network anomaly occurs; and if a network anomaly occurs, step S1803 is performed. When the non-underground garage scenario is detected, the terminal device determines whether a network anomaly occurs; and if a network anomaly occurs, step S1805 is performed.

Embodiment 5

Figure 19:
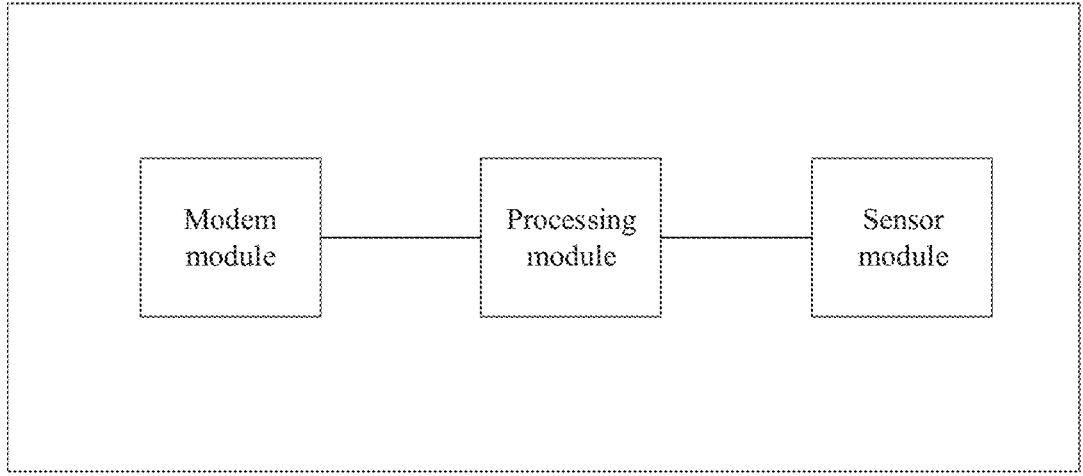
FIG. 19 is a schematic diagram of a structure of an electronic device according to an embodiment of this application.

FIG. 19 is a schematic diagram of an example structure of a terminal device according to an embodiment of this application. As shown in the figure, the terminal device includes a sensor module, a modem module, and a processing module. The sensor module includes various types of motion sensors, such as an accelerometer and a gyroscope. The sensor module is configured to collect motion data. The modem module is configured to detect that the terminal device is dropped from a network or falls into a lower RAT, and search for and access a target network. The modem module may include one or more modems. The processing module is configured to perform scenario detection, exit detection, and the like. The processing module may include one or more processors, and the processor may be an application processor, a central processing unit, or the like.

Figure 20:
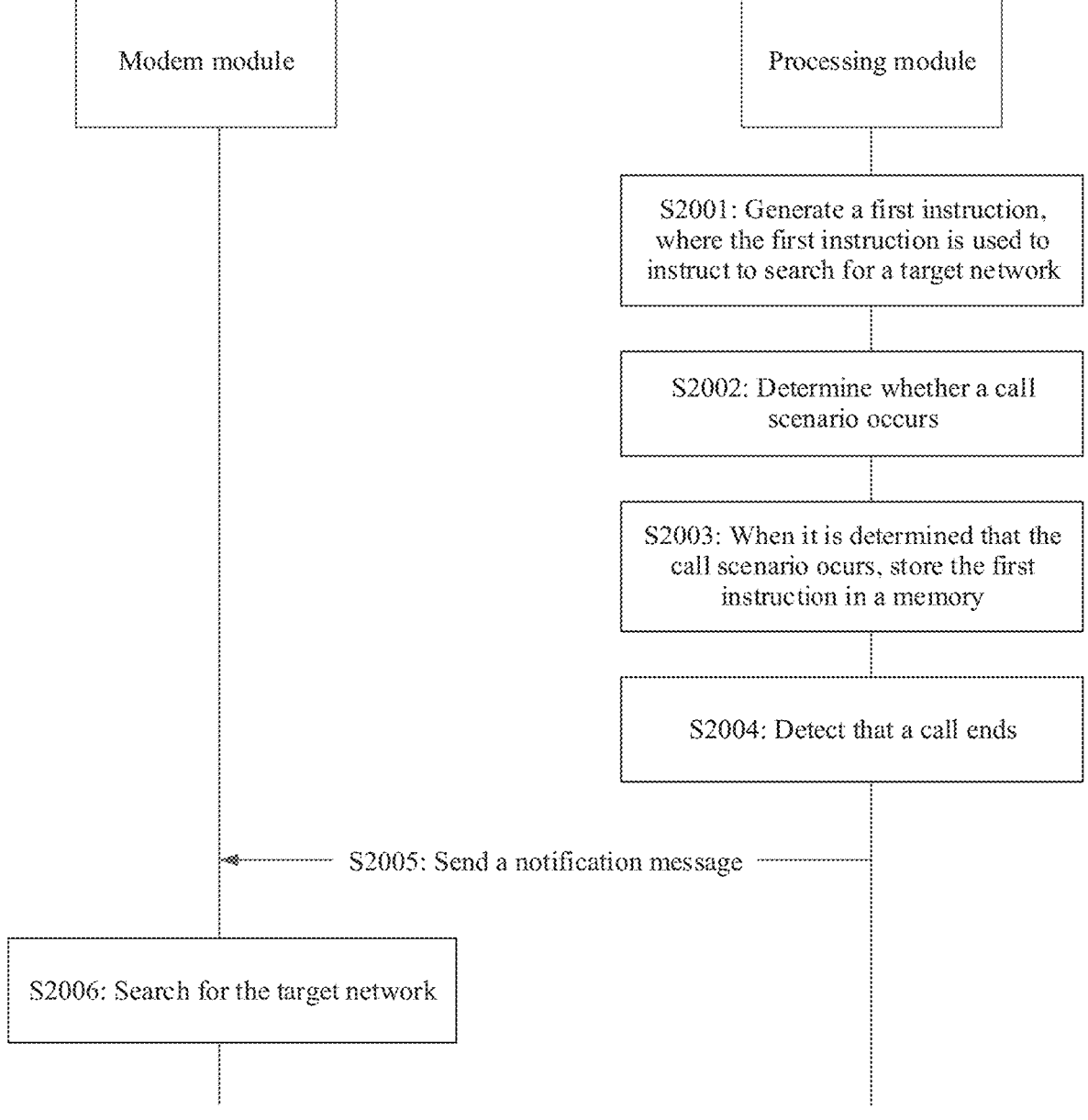
FIG. 20 is a schematic diagram of interaction between a modem module and a processing module in an electronic device according to an embodiment of this application.

FIG. 20 is a schematic flowchart of another network search method according to an embodiment of this application. As shown in FIG. 20, the method includes the following steps.

S2001: A processing module generates a first instruction, where the first instruction is used to instruct to search for a target network.

S2002: The processing module determines whether the terminal device is currently in a call scenario.

In a possible manner, the processing module may detect whether a current display interface is a call interface; and if yes, the processing module determines that the terminal device is in the call scenario; otherwise, the processing module determines that the terminal device is not in the call scenario. Alternatively, the processing module may detect whether a currently running application is a preset application. The preset application includes an application that can perform a video or audio call, such as a telephony application or a WeChat application. Specifically, the processing module may read an application package name of the currently running application, and determine, by using the application package name, whether the currently running application is the preset application. When determining that the currently running application is the preset application, the terminal device detects whether a currently running process (process) in the currently running application is a call process; and if the process is the call process, the terminal device determines that the terminal device is currently in the call scenario; otherwise, the terminal device determines that the terminal device is not currently in the call scenario. Specifically, the terminal device may determine, by reading a process name, whether the currently running process is the call process.

S2003: When determining that the processing module is currently in the call scenario, the processing module stores the first instruction in a memory.

S2004: The processing module detects that the call ends.

In some embodiments, the processing module may detect the call scenario in real time. In a possible manner, w % ben detecting that a current display interface is not a call interface, the processing module determines that the call ends. Alternatively, when detecting that the preset application ends running (for example, exits the application), the processing module determines that the call ends. Alternatively, when detecting that a call process in the preset application ends running, the processing module determines that the call ends. The preset application includes an application that can perform a video or audio call, such as a telephony application or a WeChat application.

S2005: The processing module sends the first instruction in the memory to a modem module.

S2006: The modem module searches for the target network, and connects to the target network after finding the target network.

Figure 21:
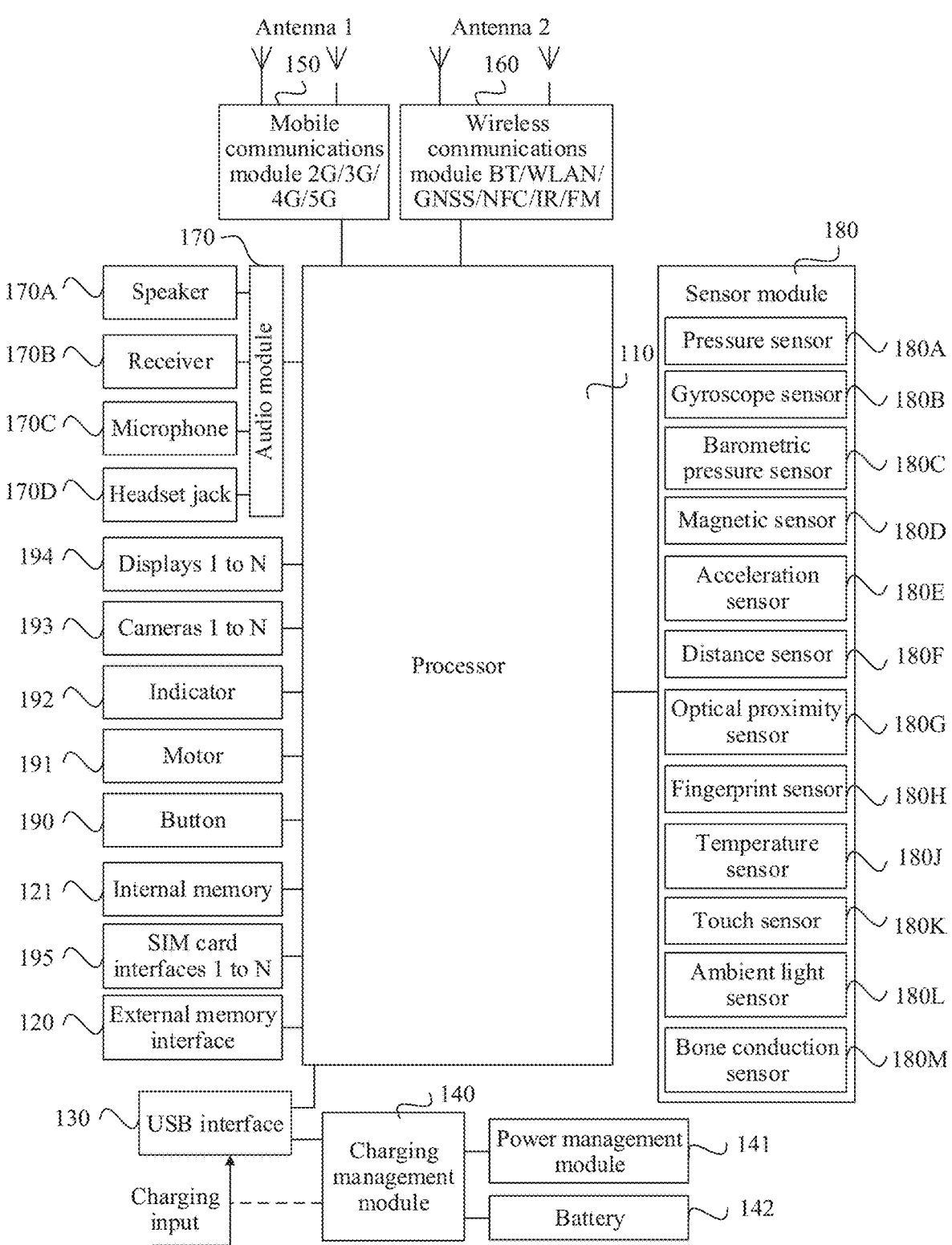
FIG. 21 is a schematic diagram of another structure of an electronic device according to an embodiment of this application.

The following describes an electronic device according to an embodiment of this application. FIG. 21 is a schematic diagram of a structure of an electronic device 100. The electronic device 100 may be the terminal device described above, or components in the electronic device 100 may be completely the same as or not completely the same as components of the terminal device described above.

The electronic device 100 is used as an example below to describe embodiments in detail. It should be understood that the electronic device 100 shown in FIG. 1 is merely an example, and the electronic device 100 may have more or fewer components than those shown in FIG. 1, or may combine two or more components, or may have different component configurations. Various components shown in the figure may be implemented by using hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 1803, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware. For detailed structure description of the electronic device 100, refer to the previous patent application CN201910430270.9.

The electronic device 100 shown in FIG. 21 may correspond to the electronic device shown in FIG. 19. The processing module is the processor 100 in the electronic device 100. The modem module may be a modem (not shown in the figure) in the electronic device 100, may be integrated into the processor 110, or may be a component independent of the processor 110. The sensor module may be the sensor module 180 in the electronic device 100.

In embodiments provided in this application, the methods provided in embodiments of this application are described from the perspective in which the terminal device (for example, the mobile phone) is used as an execution body. To implement functions in the foregoing method provided in embodiments of this application, the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like. In a case in which no conflict occurs, the solutions in the foregoing embodiments may be combined for use.

It should be noted that a part of this patent application document includes copyright protected content. The copyright owner reserves the copyright except copies are made for the patent documents or the recorded content of the patent documents in the Patent Office.

What is claimed is:
1. A network search method, comprising:
accessing, by a terminal device, a network of a first communications radio access technology (RAT), wherein the terminal device is configured to perform wireless communications;
determining, by the terminal device, that a network anomaly occurs, wherein the network anomaly comprises: no network or a fall into a lower RAT;
detecting, by the terminal device based on currently collected data and a historical exit parameter, a second time point at which the terminal device has exited an underground garage, wherein the historical exit parameter comprises historical data collected by the terminal device to represent that the terminal device moves out of the underground garage, wherein the historical exit parameter comprises at least one of: an attitude angle of the terminal device indicating a specific climbing motion when exiting the underground garage, a curve of the attitude angle changing with time that corresponds to a garage exit pattern, a climbing start time point when the terminal device begins an upward movement pattern typical of garage exits, or collected cell information comprising cell identifiers and signal strength information detected when the terminal device historically moves out of the underground garage;
searching, by the terminal device, for a network of a target communications RAT at a first time point, wherein the target communications RAT is a communications RAT that is not lower than the first communications RAT; and connecting, by the terminal device, to the network of the target communications RAT, wherein the terminal device is in an underground garage scenario, the second time point is a time point at which the terminal device detects that it has exited an underground garage, and the first time point is a time point after the second time point at which the terminal device starts searching the network of the target communications RAT.

2. The method according to claim 1, wherein the terminal device is in a connected mode, and wherein the searching, by the terminal device, for a network of a target communications RAT comprises:
searching, by the terminal device, for a first cell, wherein a communications RAT of the first cell is the target communications RAT, a second cell is a neighboring cell of a third cell and configured by a network device, and the third cell is a cell connected to the terminal device when the terminal device falls into a lower RAT.

3. The method according to claim 2, wherein the first cell is a cell found by the terminal device in a legacy network search process.

4. The method according to claim 1, wherein the terminal device is in an idle mode, and wherein the searching, by the terminal device, for a network of a target communications RAT comprises:
searching, by the terminal device, for the network of the target communications RAT in every preset time interval.

5. The method according to claim 1, wherein the search for the network of the target communications RAT is performed after a first time interval after the second time point.

6. The method according to claim 1, wherein the search for the network of the target communications RAT is performed after a second time interval after the terminal device drops from a network or falls into a lower RAT.

7. The method according to claim 1, wherein before searching for the network of the target communications RAT, the method further comprises:
determining, by the terminal device, at least one target communications RAT based on the first communications RAT.

8. The method according to claim 1, wherein searching for the network of the target communications RAT comprises one of:
searching, by the terminal device, exclusively for the network of the target communications RAT;
searching, by the terminal device, for the network of the target communications RAT continuously for at least twice; or
searching, by the terminal device, for the network of the target communications RAT at a same frequency within a preset time period.

9. The method according to claim 1, wherein the search for the network of the target communications RAT starts before a historical time point at which the terminal device successfully accesses the network of the target communications RAT after the network anomaly occurs.

10. The method according to claim 9, wherein the search for the network of the target communications RAT starts between a historical maximum failure time point and a historical minimum success time point wherein the historical minimum success time point is an earliest historical moment at which the terminal device attempts to search for the network of the target communications RAT and successfully finds the network of the target communications RAT after the network anomaly occurs, wherein the historical maximum failure time point is a latest historical moment at which the terminal device attempts to search for the network of the target communications RAT and fails to find the network of the target communications RAT after the network anomaly occurs, wherein the historical minimum success time point is after the historical maximum failure time point and before the historical time point at which the terminal device suc- cessfully accesses the network of the target communications RAT, and wherein the historical maximum failure time point is after the terminal device is dropped from a network or falls into a lower RAT.

11. The method according to claim 1, wherein the method further comprises:

in response to detecting that the terminal device is cur- rently located in a first fence corresponding to an underground garage, determining, by the terminal device, that the terminal device is underground; or determining, based on motion data collected by the ter- minal device, that the terminal device is underground.

12. The method according to claim 1, wherein the cell information comprises at least one of cell identifier infor- mation, cell signal strength information, or cell signal strength change information, wherein the cell identifier information comprises cell identifiers that are of one or more cells and that are detected when the terminal device histori- cally leaves the underground garage, the signal strength information comprises cell signal strengths that are of the one or more cells and that are detected when the terminal device historically leaves the underground garage, wherein the signal strength change information comprises a change value between a first signal strength and a second signal strength, wherein the first signal strength is a signal strength that is of a first cell and that is detected within a first preset time period before the terminal device historically leaves the underground garage, and wherein the second signal strength is a signal strength of the first cell and detected within a second preset time period after the terminal device histori- cally leaves the underground garage;

determining, by the terminal device, a success time point at which the terminal device finds the network of the target communications RAT;

determining, by the terminal device, that a time difference between the historical minimum success time point and the historical maximum failure time point is greater than a threshold; and updating, by the terminal device, the historical minimum success time point to the success time point.

13. A terminal device configured to perform wireless communications, comprising:

one or more processors;

a memory; and one or more computer programs, wherein the one or more computer programs are stored in the memory, the one or more computer programs comprise instructions for execution by the terminal device to perform operations comprising:

accessing a network of a first communications radio access technology (RAT);

determining that a network anomaly occurs, wherein the network anomaly comprises: no network or a fall into a lower RAT;

detecting, based on currently collected data and a histori- cal exit parameter, a second time point at which the terminal device has exited an underground garage, wherein the historical exit parameter comprises histori- cal data collected by the terminal device to represent that the terminal device moves out of the underground garage, wherein the historical exit parameter comprises at least one of: an attitude angle of the terminal device indicating a specific climbing motion when exiting the underground garage, a curve of the attitude angle changing with time that corresponds to a garage exit pattern, a climbing start time point when the terminal device begins an upward movement pattern typical of garage exits, or collected cell information comprising cell identifiers and signal strength information detected when the terminal device historically moves out of the underground garage;

searching for a network of a target communications RAT at a first time point, wherein the target communications RAT is a communications RAT that is not lower than the first communications RAT; and connecting to the network of the target communications RAT, wherein the terminal device is in an underground garage scenario, the second time point is a time point at which the terminal device detects that it has exited an under- ground garage, and the first time point is a time point after the second time point at which the terminal device starts searching the network of the target communica- tions RAT.

14. A chip, wherein the chip is coupled to a memory in a terminal device configured to perform wireless communi- cations, and wherein the chip is configured to invoke a computer program stored in the memory to perform opera- tions comprising:

accessing a network of a first communications radio access technology (RAT);

determining that a network anomaly occurs, wherein the network anomaly comprises: no network or a fall into a lower RAT;

detecting, based on currently collected data and a histori- cal exit parameter, a second time point at which the terminal device has exited an underground garage, wherein the historical exit parameter comprises histori- cal data collected by the terminal device to represent that the terminal device moves out of the underground garage, wherein the historical exit parameter comprises at least one of: an attitude angle of the terminal device indicating a specific climbing motion when exiting the underground garage, a curve of the attitude angle changing with time that corresponds to a garage exit pattern, a climbing start time point when the terminal device begins an upward movement pattern typical of garage exits, or collected cell information comprising cell identifiers and signal strength information detected when the terminal device historically moves out of the underground garage;

searching for a network of a target communications RAT at a first time point, wherein the target communications RAT is a communications RAT that is not lower than the first communications RAT; and connecting to the network of the target communications RAT, wherein the terminal device is in an underground garage scenario, the second time point is a time point at which the terminal device detects that it has exited an under- ground garage, and the first time point is a time point after the second time point at which the terminal device starts searching the network of the target communica- tions RAT.

15. The method according to claim 10, wherein the search for the network of the target communications RAT starts between the historical maximum failure time point and the historical minimum success time point.

16. The terminal device according to claim 13, wherein the terminal device is in a connected mode, and wherein the searching for the network of the target communications RAT comprises:

searching for a first cell, wherein a communications RAT of the first cell is the target communications RAT, a second cell is a neighboring cell of a third cell and configured by a network device, and the third cell is a cell connected to the terminal device when the terminal device falls into a lower RAT.

17. The terminal device according to claim 13, wherein the terminal device exits an underground garage at a first time point, and wherein the search for the network of the target communications RAT is performed after a first time interval after the first time point.

18. The terminal device according to claim 13, wherein the search for the network of the target communications RAT starts before a historical time point at which the terminal device successfully accesses the network of the target communications RAT after the network anomaly occurs.

19. The terminal device according to claim 18, wherein the search for the network of the target communications RAT starts between a historical maximum failure time point and a historical minimum success time point, wherein the historical minimum success time point is an earliest historical moment at which the terminal device attempts to search for the network of the target communications RAT and successfully finds the network of the target communications RAT after the network anomaly occurs, wherein the historical maximum failure time point is a latest historical moment at which the terminal device attempts to search for the network of the target communications RAT and fails to find the network of the target communications RAT after the network anomaly occurs, wherein the historical minimum success time point is after the historical maximum failure time point and before historical time point at which the terminal device successfully accesses the network of the target communications RAT, and wherein the historical maximum failure time point is after the terminal device is dropped from a network or falls into a lower RAT.

20. The terminal device according to claim 13, wherein the cell information comprises at least one of cell identifier information, cell signal strength information, or cell signal strength change information, wherein the cell identifier information comprises cell identifiers that are of one or more cells and that are detected when the terminal device historically leaves the underground garage, the signal strength information comprises cell signal strengths that are of the one or more cells and that are detected when the terminal device historically leaves the underground garage, wherein the signal strength change information comprises a change value between a first signal strength and a second signal strength, wherein the first signal strength is a signal strength that is of a first cell and that is detected within a first preset time period before the terminal device historically leaves the underground garage, and wherein the second signal strength is a signal strength of the first cell and detected within a second preset time period after the terminal device historically leaves the underground garage;

determining, by the terminal device, a success time point at which the terminal device finds the network of the target communications RAT;

determining, by the terminal device, that a time difference between the historical minimum success time point and the historical maximum failure time point is greater than a threshold; and updating, by the terminal device, the historical minimum success time point to the success time point.

\* \* \* \* \*